(12) United States Patent
Wang et al.

(10) Patent No.: US 11,258,544 B2
(45) Date of Patent: Feb. 22, 2022

(54) UPLINK TRANSMISSION METHOD AND CORRESPONDING EQUIPMENT

(71) Applicant: Samsung Electronics Co., Ltd., Gyeonggi-do (KR)

(72) Inventors: Yi Wang, Beijing (CN); Shichang Zhang, Beijing (CN); Yingyang Li, Beijing (CN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/887,702

(22) Filed: May 29, 2020

(65) Prior Publication Data

US 2020/0295882 A1 Sep. 17, 2020

Related U.S. Application Data

(63) Continuation of application No. 16/148,455, filed on Oct. 1, 2018, now Pat. No. 10,673,573.

(30) Foreign Application Priority Data

Sep. 29, 2017 (CN) .......................... 201710911429.X
Jan. 24, 2018 (CN) .......................... 201810069207.2
Feb. 8, 2018 (CN) .......................... 201810130492.4

(51) Int. Cl.
 *H04W 4/00* (2018.01)
 *H04L 1/18* (2006.01)
(52) U.S. Cl.
 CPC .......... *H04L 1/1812* (2013.01); *H04L 1/1854* (2013.01); *H04L 1/1861* (2013.01); *H04L 1/1896* (2013.01)
(58) Field of Classification Search
 CPC ... H04L 1/1812; H04L 1/1854; H04L 1/1861; H04L 1/1896
 (Continued)

(56) References Cited

U.S. PATENT DOCUMENTS

2017/0134140 A1 5/2017 Park
2017/0195103 A1 7/2017 Guan et al.
(Continued)

FOREIGN PATENT DOCUMENTS

WO WO 2017/028001 2/2017
WO WO 2017/085122 5/2017
WO WO 2018/204491 11/2018

OTHER PUBLICATIONS

Ericsson, "On HARQ Codebook", R1-1714440, Aug. 2017 (From Applicant's IDS) (Year: 2017).*

(Continued)

*Primary Examiner* — Mang Hang Yeung
(74) *Attorney, Agent, or Firm* — The Farrell Law Firm, P.C.

(57) ABSTRACT

A method performed by a user equipment (UE) in a wireless communication system includes receiving, from a base station (BS), code block group (CBG) information via radio resource control (RRC) signaling; identifying a physical downlink shared channel (PDSCH) of a plurality of PDSCHs belonging to a first PDSCH set or a second PDSCH set, based on the CBG information; determining a first hybrid automatic repeat request acknowledgement/negative acknowledgement (HARQ-ACK/NACK) codebook for the first PDSCH set and a second HARQ-ACK/NACK codebook for the second PDSCH set; and transmitting HARQ-ACK/NACK information generated by connecting the first HARQ-ACK/NACK codebook and the second HARQ-ACK/NACK codebook.

16 Claims, 11 Drawing Sheets

(58) Field of Classification Search
USPC .......................................................... 370/329
See application file for complete search history.

(56) References Cited

U.S. PATENT DOCUMENTS

| 2018/0098345 | A1 | 4/2018 | Tirola |
| 2018/0241510 | A1* | 8/2018 | Shen .................. H04L 1/18 |
| 2019/0021088 | A1 | 1/2019 | Zhang |
| 2020/0228289 | A1* | 7/2020 | He .................. H04L 5/0064 |

OTHER PUBLICATIONS

WILUS Inc., "HARQ-ACK multiplexing for CBG-based (re)transmission", R1-1714396, Aug. 2017 (From Applicant's IDS) (Year: 2017).*

Nokia, "On HARQ feedback determination", R1-17104016, Aug. 2017 (From Applicant's IDS) (Year: 2017).*

Samsung, "HARQ Management and Feedback", R1-1716005, 3GPP TSG RAN WG1 Meeting NR#3, Sep. 18-21, 2017, 10 pages.

Huawei, HiSilicon, "Discussion on CBG-based Feedback", R1-1712202, 3GPP TSG RAN WG1 Meeting #90, Aug. 21-25, 2017, 4 pages.

International Search Report dated Jan. 11, 2019 issued in counterpart application No. PCT/KR2018/011661, 13 pages.

Ericsson, "On HARQ Codebook", R1-1714440, 3GPP TSG-RAN WG1 Meeting#90, Aug. 21-25, 2017, 5 pages.

Wilus Inc., "HARQ-ACK Multiplexing for CBG-based (re)transmission", R1-1714396, 3GPP TSG RAN WG1 Meeting #90, Aug. 21-25, 2017, 5 pages.

Nokia et al., "On HARQ Feedback Determination", R1-17104016, 3GPP TSG RAN WG1 #90, Aug. 21-25, 2017, 5 pages.

European Search Report dated Sep. 28, 2020 issued in counterpart application No. 18862261.7-1205, 12 pages.

Australian Examination Report dated Oct. 30, 2020 issued in counterpart application No. 2018341374, 4 pages.

European Search Report dated Aug. 2, 2021 issued in counterpart application No. 18862261.7-1205, 5 pages.

Indian Examination Report dated Jun. 4, 2021 issued in counterpart application No. 202037015051, 5 pages.

* cited by examiner

UPLINK TRANSMISSION METHOD AND CORRESPONDING EQUIPMENT

CROSS-REFERENCE TO RELATED APPLICATION(S)

This application is a Continuation Application of U.S. application Ser. No. 16/148,455, filed on Oct. 1, 2018, which is based on and claims priority under 35 U.S.C. § 119 to Chinese Patent Application No. 201710911429.X, filed on Sep. 29, 2017, Chinese Patent Application No. 201810069207.2, filed on Jan. 24, 2018, and Chinese Patent Application No. 201810130492.4, filed on Feb. 8, 2018, the disclosures of which are incorporated by reference herein in their entireties.

BACKGROUND

1. Field

The present disclosure generally relates to mobile communication, and, more particularly, to an uplink transmission method and a corresponding equipment.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a beyond 4G network or a post long term evolution (LTE) system. The 5G communication system is considered to be implemented in higher frequency (i Wave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet is now evolving to the Internet of things (IoT) where distributed entities, such as things, exchange and process information without human intervention. The Internet of everything (IoE), which is a combination of the IoT technology and big data processing technology through connection with a cloud server, has emerged. As technology elements, such as sensing technology, wired/wireless communication and network infrastructure, service interface technology, and security technology have been demanded for IoT implementation, a sensor network, a machine-to-machine (M2M) communication, machine type communication (MTC), and so forth have been recently researched. Such an IoT environment may provide intelligent Internet technology services that create new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be an example of convergence between the 5G technology and the IoT technology.

As described above, various services can be provided according to the development of a wireless communication system, and thus a method for easily providing such services is required.

SUMMARY

The present disclosure is provided to at least solve the above problems and at least provide the following advantages.

According to an aspect of the present disclosure, a method for an uplink transmission of a user equipment (UE) in a wireless communication system is provided. The method includes receiving, from a base station (BS), control signaling; grouping physical downlink shared channels (PDSCHs) based on the control signaling, determining a hybrid automatic repeat request acknowledgement/non-acknowledgement (HARQ-ACK/NACK) codebook for each grouping of the PDSCHs; and, transmitting HARQ-ACK/NACK information corresponding to the HARQ-ACK/NACK codebook.

According to another aspect of the present disclosure, a UE is provided. The UE includes a transceiver configured to receive control signaling from a BS; and a processor configured to: group PDSCHs based on the control signaling; and determine an HARQ-ACK/NACK codebook for each group of PDSCHs, wherein the transceiver is further configured to transmit HARQ-ACK/NACK information corresponding to the HARQ-ACK/NACK codebook for the corresponding group of the PDSCHs

BRIEF DESCRIPTION OF THE DRAWINGS

These and/or other aspects, features and advantages of the present disclosure will become more apparent from the following detailed description of embodiments taken with reference to the accompanying drawings, in which.

DETAILED DESCRIPTION

Figure 1:
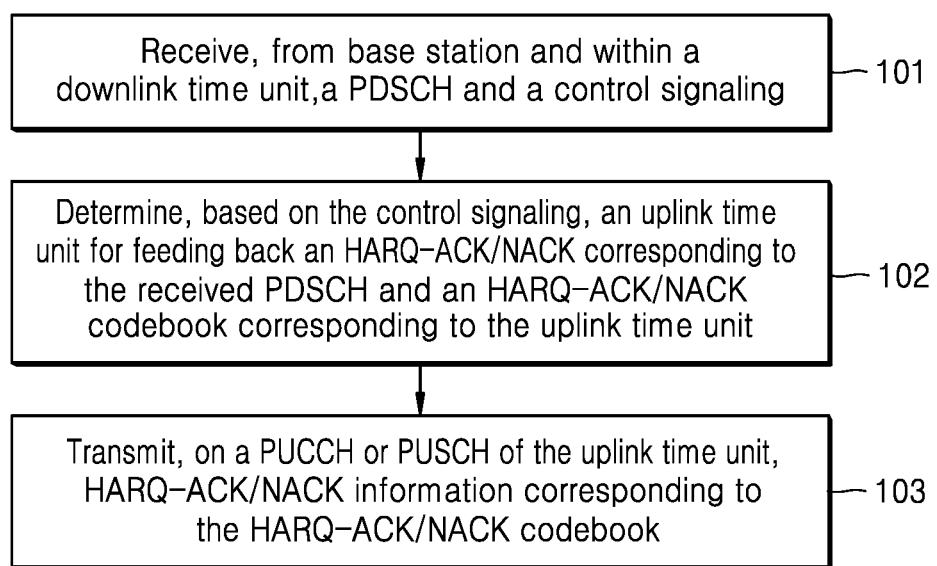
FIG. 1 is a flowchart of a method for transmitting an HARQ-ACK/NACK according to an embodiment.

The following description is provided with reference to the accompanying drawings to assist in comprehensively understanding the embodiments of the present disclosure as defined by the appended claims and equivalents thereof. Various particular details are provided for assisting in understanding, where these details are merely exemplary. Therefore, a person of ordinary skill in the art may make various alterations and modifications to the embodiments described herein without departing from the scope and spirit of the present disclosure. In addition, for clarity and simplicity, descriptions of well-known functions and structures are omitted.

The rapid development of information industry, particularly the increasing demand from the mobile Internet and the IoT, brings about unprecedented challenges in the future mobile communications technology. According to the ITU-R M. [IMT.BEYOND 2020.TRAFFIC] issued by the International Telecommunication Union (ITU), it can be expected that, by 2020, mobile services traffic will grow nearly 1,000 times as compared with that in 2010 (4G era), and the number of user device connections will also be over 17 billion, and with a vast number of IoT devices gradually expanding into the mobile communication network, the number of connected devices will be even more astonishing. In response to this unprecedented challenge, the communications industry and academia have prepared for the 2020s by launching an extensive study of the 5G mobile communications technology. Currently, in ITU-R M. [IMT.VISION] from ITU, the framework and overall objectives of the future 5G have been discussed, where the demands outlook, application scenarios and various important performance indexes of 5G have been described in detail. In terms of new demands in 5G, the ITU-R. M. [IMT.FUTURE TECHNOLOGY TRENDS] from ITU provides information related to the 5G technology trends, which is intended to address prominent issues such as significant improvement on system throughput, consistency of the user experience, scalability so as to support IoT, delay, energy efficiency, cost, network flexibility, support for new services and flexible spectrum utilization, etc. In 3rd Generation Partnership Project (3GPP), the task in the first stage of 5G has been in progress. In order to support more flexible scheduling, it is decided by the 3GPP that a variable HARQ-ACK feedback delay is supported in 5G. In an existing LTE system, the time from the reception of downlink data to the uplink transmission of HARQ-ACK is fixed. For example, in a frequency division duplex (FDD) system, the delay is 4 subframes; while in a time division duplex (TDD) system, an HARQ-ACK feedback delay is determined for a corresponding downlink subframe according to the uplink/downlink configuration. In a 5G system, whether in an FDD system or a TDD system, for a determined downlink time unit (for example, a downlink slot or a downlink mini slot), an uplink time unit capable of feeding back HARQ-ACK is variable. For example, the delay of HARQ-ACK feedback may be dynamically indicated by a physical layer signaling, or different HARQ-ACK delays may be determined according to different services, user capabilities or other factors.

In 5G, when the HARQ-ACK delay is variable, even in an FDD system, it is also possible that the HARQ-ACK to be fed back within an uplink time unit is from downlink data of multiple downlink time units; and, the number of HARQ-ACK downlink time units to be fed back is also variable and often different for each UE. However, relative to an existing TDD system, since the HARQ-ACK delay is variable, a starting location of a bundling window for HARQ-ACK feedback is variable, and the length of the bundling window is also variable. Moreover, in 5G, in addition to an HARQ-ACK feedback mechanism using a transport block (TB) as granularity in the existing LTE system, an HARQ-ACK feedback mechanism based on a code block group (CBG) may also be employed. When PDSCHs of the two HARQ-ACK feedback mechanisms are to be fed back in a same physical uplink control channel (PUCCH) or physical uplink shared channel (PUSCH), how to design a downlink control signaling to allow a user terminal to determine an HARQ-ACK codebook and how to design an uplink control signaling to carry HARQ-ACK are issues to be urgently addressed.

FIG. 1 is a flowchart of a method for transmitting an HARQ-ACK/NACK according to an embodiment. The method for transmitting an HARQ-ACK/NACK by a UE according to an embodiment is described below with reference to FIG. 1.

Referring to FIG. 1, in step 101, a UE receives, from a base station and within a downlink time unit, a PDSCH and control signaling.

In this case, the control signaling is a downlink scheduling signaling carried by a PDSCH or a PDSCH. The control signaling may include information about HARQ-ACK/NACK timing.

In an embodiment, the information about HARQ-ACK/NACK timing may be indicated by dynamic signaling or semi-static signaling. The UE may determine, according to the received downlink time unit of a PDSCH scheduled by the control signaling and the HARQ-ACK/NACK timing information, an uplink time unit for transmitting an HARQ-ACK/NACK for the PDSCH. The base station may configure or schedule HARQ-ACK/NACKs for one or more PDSCHs to be transmitted on PUCCHs or PUSCHs in a same uplink time unit.

The UE determines, according to the configuration of the base station, a mode of determining the size of an HARQ-ACK/NACK codebook, including a semi-static determination mode and a dynamic determination mode.

In the method for semi-statically determining the size of the HARQ-ACK/NACK codebook, the size of the HARQ-ACK/NACK codebook generated by the UE may be determined according to the size of a bundling window, the number of configured carriers and the number of hits of an HARQ-ACK/NACK fed back by each PDSCH. These dimensions are determined according to semi-statically configured parameters. Alternatively, the size of the codebook may be determined according to a DAI of type III.

In the method for dynamically determining the size of the HARQ-ACK/NACK codebook, the size of the HARQ-ACK/NACK codebook generated by the UE is determined by a downlink assignment index (DAI) of type I, type II, and/or type III. The location of each bit of the HARQ-ACK/NACK for each PDSCH in the HARQ-ACK/NACK codebook is determined by the DAI of type I.

For example, the control signaling may further include indication information of the DAI of type I, type II, and/or type III.

The DAIs are numbered in a PUCCH corresponding to a same uplink time unit or a PDSCH feeding back the HARQ-ACK in a PDSCH.

For example, the DAI of type I indicates one of the following information: the relative sequential order of the PDSCH of the currently scheduled downlink time unit and PDSCHs in all scheduled downlink time units corresponding to the uplink time unit, and the bit location of the HARQ-ACK/NACK bit of the PDSCH of the currently scheduled downlink time unit in the HARQ-ACK/NACK codebook.

For example, the number of PDSCHs is counted by the DAI of type I. If the number of bits of the HARQ-ACK/NACK for the PDSCH of each downlink time unit is $N_0$, it is determined according to the value $X_0$ of the DAI of type I that a starting point of bits of the HARQ-ACK/NACK of the downlink time unit in the HARQ-ACK/NACK codebook is the $(X_0*N_0-1)^{th}$ bit. For example, if $N_0=2$ and the value of the DAI of type I is 1, it is indicated that there is one PDSCH, but this PDSCH corresponds to 2 bits. Therefore, bits of the HARQ-ACK/NACK of this PDSCH correspond to the first and second bits in the HARQ-ACK/NACK codebook. In a similar way, when the value of the DAI of type I is 4, bits of the HARQ-ACK/NACK correspond to the seventh and eighth bits in the HARQ-ACK/NACK codebook. Therefore, the UE may also determine the size of the HARQ-ACK/NACK codebook based on the DAI of type I.

In some scenarios, it is possible that the number $N_0$ of bits of the HARQ-ACK/NACK for the PDSCH of each downlink time unit is different. For example, for different carriers, the $N_0$ is different since different transmission modes are employed. The different transmission modes may include: a transmission mode supporting a single TB or multiple TBs a transmission mode supporting the use of HARQ-ACK feedback granularity of a TB (that is, one TB feeds back 1 bit of HARQ-ACK) or the use of a CBG as the granularity of feedback (that is, one TB feeds back N bits of HARQ-ACK), Where N is the number of configured CBGs; and, a transmission anode in which a CBG is used as the feedback granularity and the number of configured CBGs is different. The transmission mode may be limited to semi-statically configured transmission modes. Alternatively, the transmission mode may also include semi-statically configured transmission modes or dynamically changed transmission modes. For example, for a same carrier, the $N_0$ may also be different since different transmission modes are employed within different time units. For example, although the semi-static configuration is a transmission mode associated with the feedback granularity of a CBG, the base station may dynamically schedule the user terminal to fall back to a transmission mode associated with the feedback granularity of a TB; or, due to the scheduling requirements, for example, a lesser size of the TB, the number of bits of the HARQ-ACK fed back by the user terminal may be less than the number of configured CBGs, so that the $N_0$ also changes dynamically.

When the number $N_0$ of bits of HARQ-ACK/NACKs for PDSCHs of each downlink time unit is not completely equal, the location of the bits of the HARQ-ACK/NACK in the codebook and the bit length may be determined according to the DAI of type I and the $N_0$ of the corresponding PDSCH.

For example, the DAI of type I may also indicate the location of a starting point of the bits of the HARQ-ACK/NACK corresponding to the currently scheduled PDSCH in the HARQ-ACK/NACK codebook. For example, the first downlink time unit is based on the HARQ-ACK/NACK fed back by the CBG, where $N_0=4$; while the second downlink time unit is based on the HARQ-ACK/NACK fed back by the TB group, where $N_0=1$. Thus, the value $X_0$ of the DAI of type I of the second downlink time unit is $X_0=5$. In other words, the DAI of type I is counted per CBG, instead of being counted according to PDCCHs as in the prior art. Since the maximum value range of the DAI of type I in this method is expanded, more bits are required. For example, compared with a 2-bit DAI of type I in the existing LTE, the DAI of type I in this method needs 3 bits or 4 bits. In order to save the overhead of the DAI of type I, the DAI of type I may be indicated by using an X-bit HARQ-ACK/NACK as granularity. For example, if X=2, when the value of the DAI of type I is 2, a 4-bit HARQ-ACK/NACK is indicated.

For example, the DAI of type II indicates the total number of all scheduled PDSCHs corresponding to the uplink time unit or the total number of bits of HARQ-ACKs corresponding to all scheduled PDSCHs.

Similar to the DAI of type I, the size of the HARQ-ACK/NACK codebook may be decided by both the DAI of type II and the number $N_0$ of bits of HARQ-ACK/NACKs for PDSCHs of each downlink time unit.

For example, the contents indicated by the DAI of type III are the same as the contents indicated by the DAI of type II, or the DAI of type III indicates the total number of bits of the HARQ-ACK/NACK codebook expected to be received by the base station, wherein the total number of bits of HARQ-ACK/NACKs corresponding to PDSCHs actually scheduled by the base station is less than or equal to the total number of bits expected. For example, the DAI of type III is contained in downlink control information (DCI) of control signaling for scheduling uplink transmission, and the DAI of type I and the DAI of type II are contained in DCI of control signaling for scheduling downlink transmission. When an HARQ-ACK is transmitted on a PUSCH and the PUSCH must perform rate matching according to the HARQ-ACK codebook, the size of the HARQ-ACK codebook is indicated by the DAI of type III.

For example, the DAI of type III corresponds to a group of values configured by a higher layer or corresponds to a group of values predefined by the standard. For example, the base station configures four values through radio resource control (RRC) signaling, and 10, 20, 30 and 40 correspond to four states when the value of the DAI of type III is 1, 2, 3 and 4, respectively.

In a carrier aggregation scenario, the DAI of type III indicates the total number of bits of HARQ-ACK feedback of all carriers; or, the DAI of type III indicates the maximum number L of bits of HARQ-ACK feedback of each carrier. The L is identical for each carrier, and the total number of bits of HARQ-ACK codebooks of all carriers is the sum of the maximum number of bits of HARQ-ACK feedback of each carrier. In some implementations, when the total number of HARQ-ACKs corresponding to the actually scheduled PDSCHs is less than the value indicated by the DAI of type III, a reserved bit is transmitted at a corresponding bit location.

For example, the DAI of type III may be equal to the total number of bits of the HARQ-ACK codebook, or a product of the DAI of type III multiplied by a variable predefined or configured by a higher layer is equal to the total number of bits of the HARQ-ACK codebook. The variable may be identical or different for each carrier.

The DAI of type I, type II, and/or type III has a limited number of bits, for example, 2 bits, but may indicate a value greater than 4 by modulo operation. For example, when it is indicated that the number M of downlink time units corresponding to HARQ-ACK/NACKs fed back to be transmitted in a same uplink time unit is greater than the range indicated by the hits of the DAI, in this embodiment, the value of the corresponding DAI is a result of moduloing M_dai by M. For example, if M is equal to 8 but the DAI has only 2 bits, DAI=3 in the table may indicate 3 or 7.

Implementations are described below in detail by embodiments of the present disclosure. In FIG. 1, in step 102, the UE determines, based on the control signaling, an uplink time unit for feeding back an HARQ-ACK/NACK corresponding to the received PDSCH and an HARQ-ACK/NACK codebook corresponding to the uplink time unit. Further, in step 103, the UE transmits, on a PUCCH or PUSCH of the uplink time unit, HARQ-ACK/NACK information corresponding to the HARQ-ACK/NACK codebook.

Subsequently, implementations of this step are described below with reference to FIGS. 2 to 8.

The following description is provided according to a first embodiment of the present disclosure.

If PDSCHs required to feed back HARQ-ACKs to be transmitted in a same uplink time unit have different HARQ-ACK bit lengths, a user terminal cannot determine the number of bits of HARQ-ACKs of undetected PDSCHs by using DAI indicative of the number of PDSCHs. In an implementation, DAIs are counted in unit of the number of bits of HARQ-ACKs instead of PDSCHs. However, the overhead of the DAIs will be very high.

In order to still count DAIs per PDSCH without increasing the DAI overhead, the base station must group PDSCHs required to feed back HARQ-ACK/NACKs; and, the DAI of type I and/or the DAI of type II is counted within each group, and/or the DAI of type II is counted within each PDSCH group and then jointly counted in all PDSCH groups.

For example, bits of HARQ-ACK/NACKs of all groups are connected in a predefined sequential order to form an HARQ-ACK/NACK codebook, and the HARQ-ACK/NACK codebook is transmitted by a PUCCH or a PUSCH.

For example, the HARQ-ACK/NACK codebook for each group is transmitted by a respective PUCCH or PUSCH.

Figure 2:
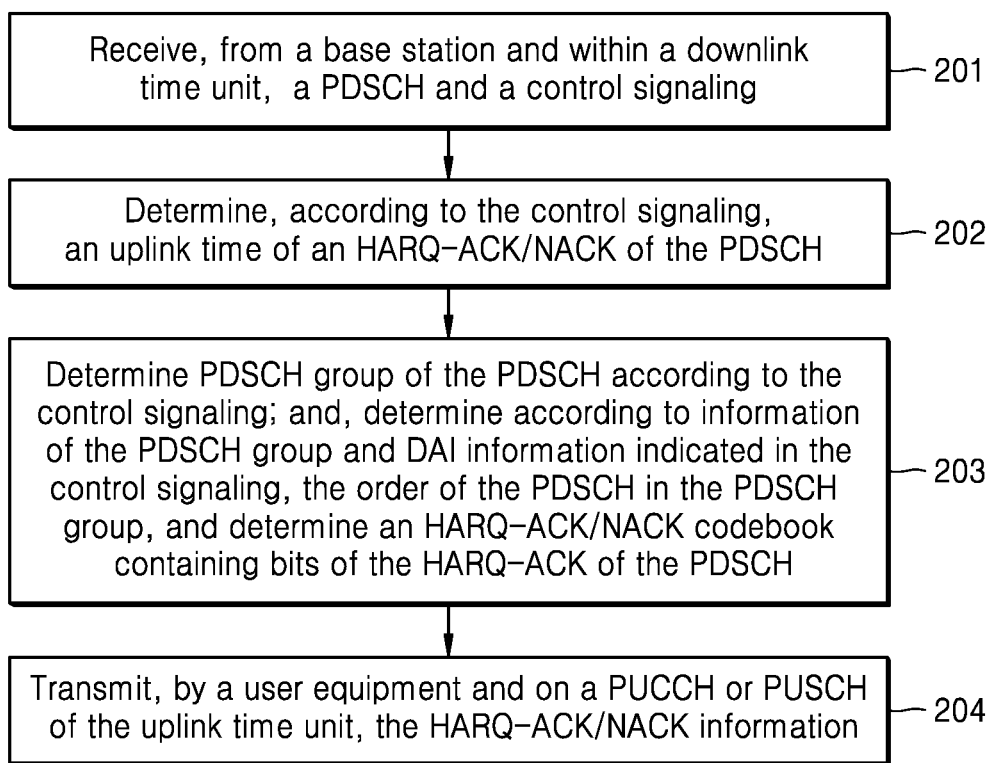
FIG. 2 is a flowchart of a method for HARQ-ACK/NACK feedback according to an embodiment.

Thus, the steps in FIG. 1 may be further divided as illustrated in FIG. 2 as follows.

FIG. 2 is a flowchart of a method for HARQ-ACK/NACK feedback according to a first embodiment of the present disclosure. Referring to FIG. 2, in step 201, a UE receives, from a base station and within a downlink time unit, a PDSCH and control signaling.

Step 202: The UE determines, according to the control signaling, an uplink time unit to which an HARQ-ACK for the PDSCH belongs.

Step 203: The UE determines, according to the control signaling, a PDSCH group to which the PDSCH belongs. According to the PDSCH grouping information and the DAI information indicated in the control signaling, the order of the PDSCH in the PDSCH group is determined, and an HARQ-ACK codebook containing bits of the HARQ-ACK for the PDSCH is determined.

Step 204: The UE transmits the HARQ-ACK/NACK information on a PUCCH or a PSCH of the uplink time unit.

The sequential order of executing the steps 202 and 203 is not intended to be limited to any particular order.

In step 203, the determination of a PDSCH group to which the PDSCH belongs may be implemented by at least one of the following methods.

Method 1: Each PDSCH group is determined according to the bit length of an HARQ-ACK/NACK fed back by each PDSCH. For example, PDSCHs feeding back HARQ-ACK/NACKs having a bit length less than or equal to N1 are classified into one group, i.e., a first group, and PDSCHs feeding back HARQ-ACK/NACKs having a bit length greater than N1 are classified into one group, i.e., a second group. Of course, it is possible to set multiple bit length thresholds to realize multiple groups. Two groups are taken as an example. For PDSCHs in the first group, if the bit length of the fed-back HARQ-ACK/NACK is less than N1, the bit length is supplemented to N1 bits by transmitting a reserved bit. For PDSCHs in the second group, if the bit length of the fed-back HARQ-ACK/NACK is set as N2 and if the bit length of a fed-back HARQ-ACK/NACK is less than N2, the bit length is supplemented to N2 bits by transmitting a reserved bit.

Method 2: Each PDSCH group is determined according to the granularity of an HARQ-ACK/NACK fed back by each PDSCH. PDSCHs associated with the HARQ-ACK/NACK feedback granularity of a TB are classified into one group, i.e., a first group, where the number of bits of the HARQ-ACK/NACK fed back by each PDSCH is 1 or 2; and, PDSCHs associated with the HARQ-ACK/NACK feedback granularity of a CBG are classified into a second group. In the second group, no matter whether or not the number of CBGs on each carrier configured by the base station is identical, the length of HARQ-ACK/NACK feedback per PDSCH is N2. If the bit length of the fed-back HARQ-ACK/NACK is less than N2, the bit length is supplemented to N2 bits by transmitting a reserved bit.

Generally, each downlink time unit and/or each downlink carrier of the HARQ-ACK/NACK fed back to be transmitted in a same uplink time unit may be configured with different HARQ-ACK/NACK feedback modes. Some downlink time units/downlink carriers are configured with TB-based HARQ-ACK/NACK feedback, while other downlink time units/downlink carriers are configured with CBG-based HARQ-ACK/NACK feedback by the base station. The configuration is a semi-static configuration, for example, a configuration using an RRC signaling.

Generally, the base station semi-statically configures the HARQ-ACK/NACK feedback mode per carrier, or the base station semi-statically configures the HARQ-ACK/NACK feedback mode per downlink (DL) bandwidth part (BWP). For example, for a carrier, the base station may configure multiple DL BWPs, and configure TB-based HARQ-ACK/NACK feedback or CBG-based HARQ-ACK/NACK feedback as well as CBG parameters (e.g., the maximum number of CBGs, etc.) for each DL BWP.

In accordance with Method 1, carriers configured with TB-based HARQ-ACK/NACK feedback, carriers configured with CBG-based HARQ-ACK/NACK feedback and carriers having a number of configured CBGs less than or equal to N1 are fixedly allocated to the first group. For carriers configured with CBG-based HARQ-ACK/NACK feedback, according to the number of bits of HARQ-ACK/NACKs to be fed back by actually scheduled PDSCHs, it is determined whether these carriers are allocated to the first group or the second group. If the number of bits of HARQ-ACK/NACKs actually to be fed back is greater than N1, the carriers are allocated to the second group; otherwise, the carriers are allocated to the first group. The number of hits of HARQ-ACK to be fed back by actually scheduled PDSCHs may be determined by at least one of the following methods.

If the base station schedules a PDSCH by using DCI or DCI in a common search space, the number of bits of the HARQ-ACK for the PDSCH is 1 or 2. The fallback DCI is DCI similar to DCI 1A in the LTE system, and a UE may be scheduled by the fallback mode in various transmission modes. The fallback DCI indicates that the granularity of HARQ-ACK/NACK feedback for the scheduled PDSCH is a TB instead of a CBG.

The base station uses normal DCI to explicitly indicate that the granularity of HARQ-ACK/NACK feedback is a TB, the bits of the HARQ-ACK/NACK for the PDSCH is 1 bit or 2 bits.

If the base station uses normal DCI to explicitly or implicitly indicate the HARQ-ACK/NACK feedback uses CBGs as unit, the number of bits of the actually fed-back HARQ-ACK is M=min(c,N), where N is the number of CBGs configured by the base station and c is the number of divisible CBs determined according to the size of the TB. The PDSCH group is determined by comparing the M with the threshold N1.

If the base station schedules a PDSCH by scheduling DCI in a mini slot, it is assumed that the number of bits of the HARQ-ACK for the PDSCH is N3. Typically, the PDSCH scheduled based on the mini slot employs TB-based feedback. Alternatively, according to the length of the mini slot, the PDSCH scheduled based on the mini slot is determined or configured with TB-based feedback or CBG-based feedback. Alternatively, according to the length of the mini slot, the number N of CBGs of the CBG-based feedback is determined or configured for the PDSCH scheduled based on the mini slot. Generally, the length of the mini slot may be configured as 2 symbols, 4 symbols or 7 symbols. The group of the PDSCH is determined by comparing N3 with the threshold N1.

The base station determines the bit length N4 for feeding back HARQ-ACK by using the length of the scheduled PDSCH. For example, if the length of the PDSCH is less than or equal to a predefined threshold, the TB-based feedback is employed; otherwise, the CBG-based feedback is employed. The group of the PDSCH is determined by comparing N4 with the threshold N1.

Figure 3:
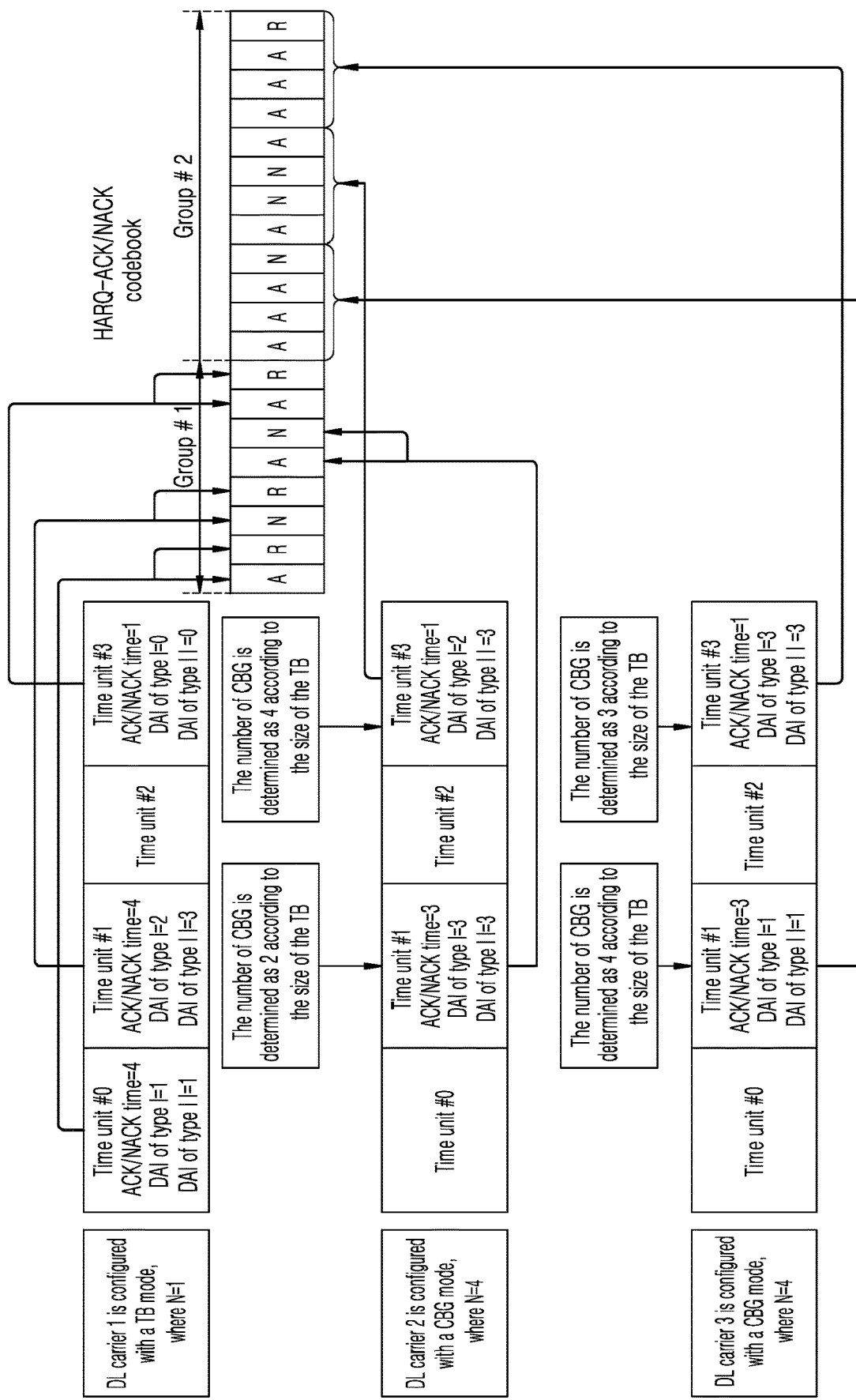
FIG. 3 is a schematic diagram of HARQ-ACK/NACK feedback according to an embodiment.

FIG. 3 is a schematic diagram HARQ-ACK/NACK feedback according to the first embodiment.

Referring to FIG. 3, a carrier 1 is configured with the TB-based HARQ-ACK/NACK feedback, and carriers 2 and 3 are configured with the CBG-based HARQ-ACK/NACK feedback, where N=4. For example, the scheduled PDSCHs shown in FIG. 3 feed HARQ-ACKs back corresponding to a same PUCCH. For example, N1=2, that is, the number of bits of the HARQ-ACK fed back by one PDSCH is less than or equal to 2, the PDSCH is in the first group; otherwise, the PDSCH is in the second group. For a carrier 2, a PDSCH is scheduled within a time unit #1, and the PDSCH may be divided into only two CBGs since the TB size of the PDSCH is small, so that the number of bits of the HARQ-ACK/NACK feedback is 2. For the carrier 2, a PDSCH is scheduled within a time unit #3, and the PDSCH may be divided into N=4 CBGs since the TB size is large, so that the number of bits of the HARQ-ACK/NACK feedback is 4. For a carrier 3, a PDSCH is scheduled within the time unit #1, and the PDSCH may be divided into N=4 CBGs since the TB size is large, so that the number of bits of the HARQ-ACK/NACK feedback is 4. For the carrier 3, a PDSCH is scheduled within the time unit #3, and the PDSCH may be divided into 3 CBGs since the TB size is small, so that the number of bits of the HARQ-ACK/NACK feedback is 3, Since the bit length threshold of the HARQ-ACK/NACK in the group is N1=2, the carrier 1 of the time unit #0, the carriers 1 and 2 of the time unit #1 and the carrier 1 of the time unit #3 belong to a carrier group #1, and the carrier 3 of the time unit #1 and the carriers 2 and 3 of the time unit #3 belong to a carrier group #2; and, DAIs are counted in each group. Thus, the order of the HARQ-ACK eventually fed back by the UE is as follows: 2 bits (one bit is generated according to the result of decoding, while the other bit is a reserved bit) of the carrier 1 of the time unit #0, 2 bits (one bit is generated according to the result of decoding, while the other bit is a reserved bit) of the carrier 1 of the time unit #1, 2 bits of the carrier 2 of the time unit #1, 2 bits (one bit is generated according to the result of decoding, while the other bit is a reserved bit) of the carrier 1 of the time unit #3, 4 bits of the carrier 3 of the time unit #1, 4 bits of the carrier 2 of the time unit #3, and 4 bits (three bits are generated according to the result of decoding, while the other bit is a reserved bit) of the carrier 3 of the time unit #3.

If the base station configures the HARQ-ACK feedback mode per BWP, the groups are determined according to the BWP. In accordance with Method 1, if the BWP of which PDSCH is received is configured with TB-based HARQ-ACK/NACK feedback, or if the BWP is configured with CBG-based HARQ-ACK/NACK feedback and the number of configured CBGs is less than or equal to N1, the PDSCH is allocated to the first group. For a MVP which is configured with CBG-based HARQ-ACK/NACK feedback and having a number of configured CBGs greater than N1, it is determined, according to the number of bits of the HARQ-ACK/NACK to be fed back by a PDSCH actually scheduled in this BWP, whether this PDSCH is allocated to the first group or the second group. That is, if the number of bits of the HARQ-ACK/NACK actually to be fed back is greater than N1, the PDSCH is allocated to the second group; otherwise, the PDSCH is allocated to the first group. The number of bits of the HARQ-ACK to be fed back by the actually scheduled PDSCH may be determined by one or more of the above methods.

In accordance with Method 2, carriers configured with TB-based HARQ-ACK/NACK feedback are fixedly allocated to the first group; and, for carriers configured with CBG-based HARQ-ACK/NACK feedback, it is determined according to the actual scheduling whether these carriers are allocated to the first group or the second group. If the scheduling of PDSCHs of the carriers configured with the CBG-based HARQ-ACK/NACK feedback is in one of the following situations, the PDSCHs of the carriers are allocated to the first group; otherwise, the PDSCHs of the carriers are allocated to the second group.

The base station schedules PDSCHs by using a fallback DCI or DCI in a common search space. The fallback DCI is DCI similar to DCI 1A in the LTE system, and a UE may be scheduled by this fallback DCI in various transmission modes.

The fallback DCI indicates that the granularity of HARQ-ACK/NACK feedback for the scheduled PDSCH is a TB instead of a CBG.

The base station uses normal DCI to explicitly indicate that the granularity of HARQ-ACK/NACK feedback is a TB.

The base station schedules PDSCHs by scheduling DCI in a mini slot; or, if the base station schedules PDSCHs by scheduling DCI in a mini slot, and the length of the mini slot is less than or equal to a predefined threshold, the granularity of HARQ-ACK/NACK feedback for the scheduled PDSCH is a TB.

Figure 4:
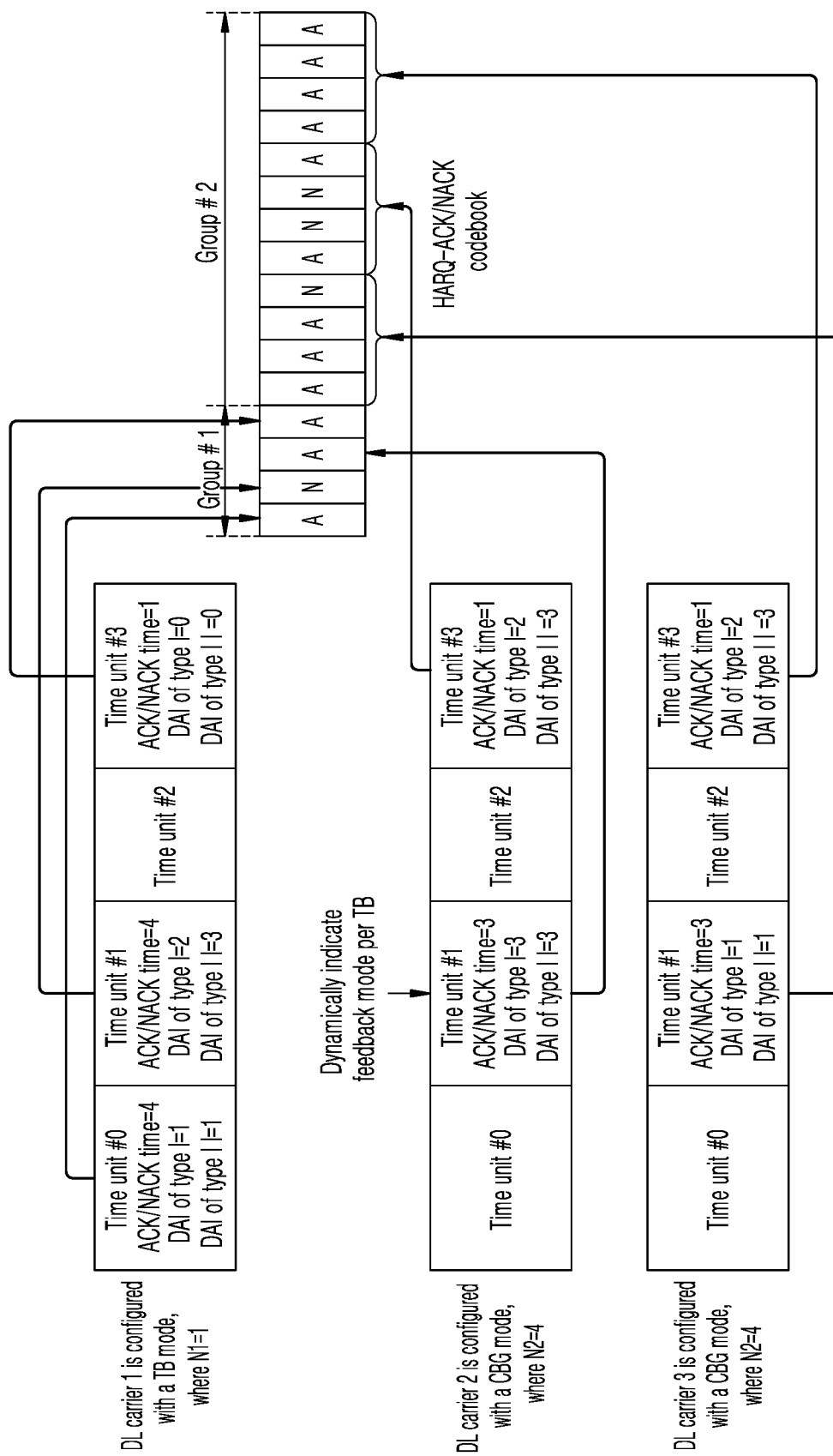
FIG. 4 is a schematic diagram of HARQ-ACK/NACK feedback according to an embodiment.

FIG. 4 is a schematic diagram HARQ-ACK/NACK feedback according to the first embodiment.

Referring to FIG. 4, a carrier 1 is configured with the TB-based HARQ-ACK/NACK feedback, where N1=1; and carriers 2 and 3 are configured with the CBG-based HARQ-ACK/NACK feedback, where N2=4. For example, the scheduled PDSCHs shown in FIG. 4 feed HARQ-ACKs back corresponding to a same PUCCH. For the carrier 2, a PDSCH is scheduled within a time unit #1, and the base station dynamically indicates that the granularity of the ACK/NACK feedback for the PDSCH in the current time unit is the TB. For example, by setting all CBG indication bits in the normal DCI as all 0, the granularity of feedback is indicated as the TB. Thus, the carrier 1 of the time unit #0, the carriers 1 and 2 of the time unit #1 and the carrier 1 of the time unit #3 all belong to a carrier group #1, and the carrier 3 of the time unit #1 and the carriers 2 and 3 of the time unit #3 all belong to a carrier group #2; and, DAIs are counted in each group. Thus, the order of the HARQ-ACK eventually fed back by the UE is as follows: 1 bit of the carrier 1 of the time unit #0, 1 bit of the carrier 1 of the time unit #1, 1 bit of the carrier 2 of the time unit #1, 1 bit of the carrier 1 of the time unit #3, 4 bits of the carrier 3 of the time unit #1, 4 bits of the carrier 2 of the time unit #3, and 4 bits of the carrier 3 of the time unit #3.

Figure 5:
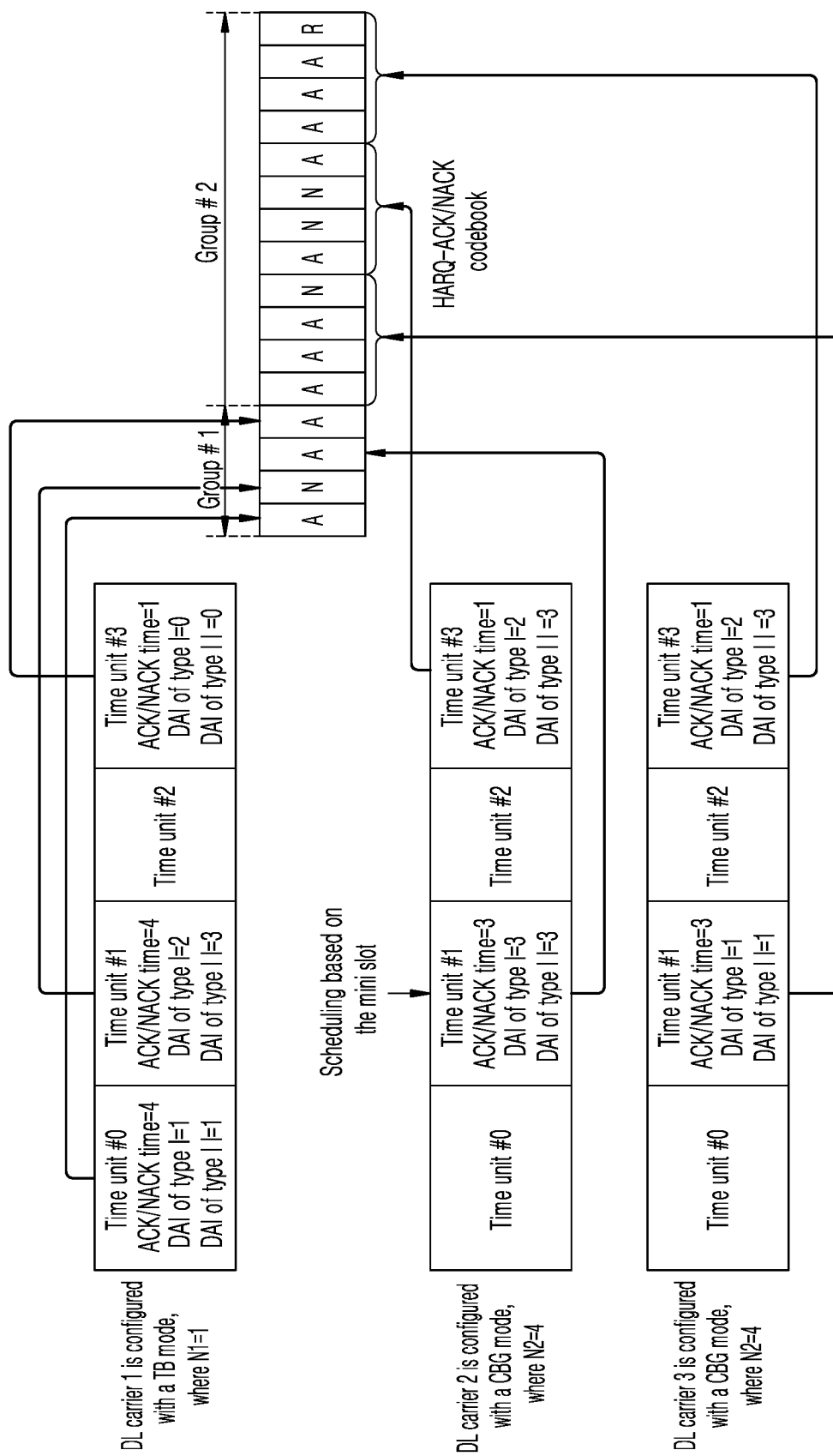
FIG. 5 is a schematic diagram of HARQ-ACK/NACK feedback according to an embodiment.

FIG. 5 is a schematic diagram of HARQ-ACK/NACK feedback according to the first embodiment. Referring to FIG. 5, a carrier 1 is configured with the TB-based HARQ-ACK/NACK feedback, where N1=1; and carriers 2 and 3 are configured with the CBG-based HARQ-ACK/NACK feedback, where N2=4. The carrier 2 is configured to be scheduled based on a slot or scheduled based on a mini slot. For example, the length of the 110 configured mini slot is 2 symbols, that is, the length of the scheduled PDSCH is 2 symbols. It is obvious that a PDSCH having a length of only two symbols achieves a very small gain when it is used for CBG based scheduling and feedback, so that the granularity of the scheduling and feedback of PDSCH in this length is generally set as the TB. For example, the scheduled PDSCHs shown in FIG. 5 feed HARQ-ACKs back corresponding a same PUCCH. For the carrier 2, a PDSCH is scheduled within the time unit #1, and the PDSCH is scheduled based on a mini slot, so that the fed-back HARQ-ACK/NACK uses the TB as granularity; and, the PDSCH of the carrier 2 scheduled within the time unit #3 is scheduled based on a slot, the fed-back HARQ-ACK/NACK uses the CBG as granularity. Thus, the carrier 1 of the time unit #0, the carriers 1 and 2 of the time unit #1 and the carrier 1 of the time unit #3 all belong to a carrier group #1, and the carrier 3 of the time unit #1 and the carriers 2 and 3 of the time unit #3 all belong to a carrier group #2; and, DAIs are counted in each group. Thus, the order of the HARQ-ACK eventually fed back by the UE is as follows: 1 bit of the carrier 1 of the time unit 0, 1 bit of the carrier 1 of the time unit #1, 1 bit of the carrier 2 of the time unit #1, 1 bit of the carrier 1 of the time unit #3, 4 bits of the carrier 3 of the time unit #1, 4 bits of the carrier 2 of the time unit #3, and 4 bits of the carrier 3 of the time unit #3.

If the base station configures the HARQ-ACK feedback mode per BWP, the groups are determined according to the BWP. In accordance with the Method 2, if this BWP of which PDSCH is received is configured with the TB-based HARQ-ACK/NACK feedback, the PDSCH is allocated to the first group; however, if the BWP of which PDSCH is received is configured with the CBG-based HARQ-ACK/NACK feedback, it is determined, according to the granularity of the HARQ-ACK/NACK to be fed back by the PDSCH actually scheduled in this BWP (i.e., whether with TB-based feedback or CBG-based feedback), whether the PDSCH is allocated to the first group or the second group. The granularity of the HARQ-ACK to be fed back by the actually scheduled PDSCH may be determined by one or more methods in the Method 2.

If the base station configures the HARQ-ACK feedback mode per carrier, the number N1 of bits of the HARQ-ACK feedback of PDSCHs in the first group is determined according to the maximum value of the number of bits of the HARQ-ACKs to be fed back by the PDSCHs in this group. For example, if the base station does not configure HARQ-ACK spatial bundling to apply and at least one BWP in this group is configured by the base station to at most support transmission of 2 TBs, N1 is 2 bits, that is, each PDSCH in the first group feeds back 2 bits of the HARQ-ACK, which is not related to whether the BWP of this PDSCH is configured to at most support one TB or two TBs and whether this PDSCH is scheduled by fallback DCI or normal DCI. For another example, if the base station does not configure the HARQ-ACK spatial bundling to apply and any BWP in this group is configured by the base station to at most support one TB, N1 is 1 bit. For another example, if the base station configures HARQ-ACK spatial bundling to apply, N1 is 1 bit. The number N2 of bits of the HARQ-ACK feedback of PDSCHs in the second group is determined according to the maximum value of the number of bits of HARQ-ACKs possibly to be fed back in this group. For example, the N2 is determined according to the maximum value of the maximum number $N_0$ of CBGs of carriers configured with the CBG-based HARQ-ACK/NACK feedback.

If the base station configures the HARQ-ACK/NACK feedback mode per BWP, the number N1 of bits of the HARQ-ACK feedback of PDSCHs in the first group is determined according to the maximum value of the number of bits HARQ-ACKs to be fed back by the PDSCHs in this group. This method is the same as the method in the HARQ-ACK feedback mode per carrier. The number N2 of bits of the HARQ-ACK, feedback of PDSCHs in the second group is determined according to the maximum value of the number of bits of HARQ-ACKs possibly to be fed back in this group. For example, the N2 is determined according to the maximum value of the maximum number $N_0$ of CBGs of all BWPs configured with the CBG-based HARQ-ACK/NACK feedback. Advantageously, the problem of the uncertain number of bits of the HARQ-ACK resulted from undetected PDCCHs is avoided.

Figure 6:
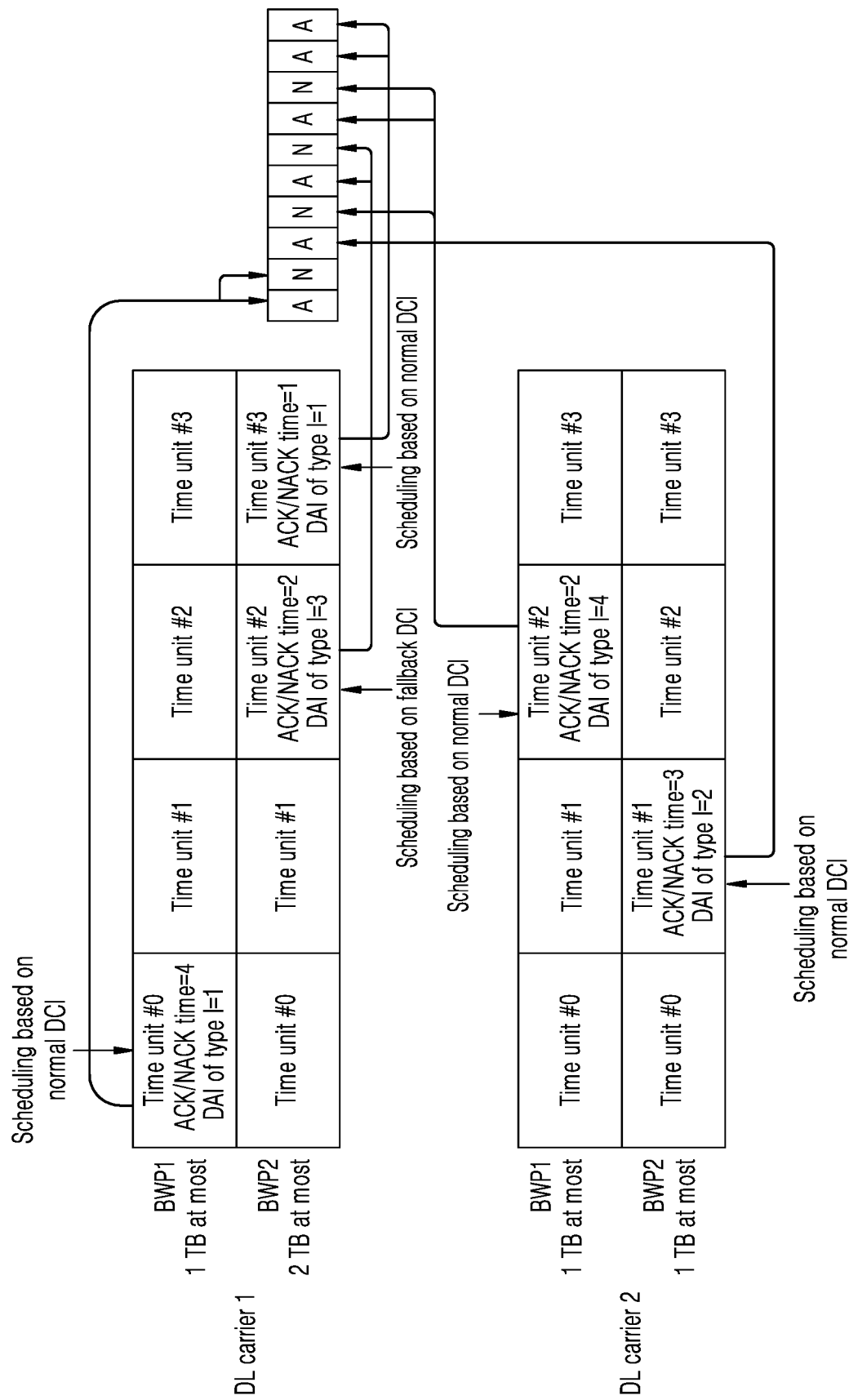
FIG. 6 is a schematic diagram of HARQ-ACK/NACK feedback according to an embodiment.

FIG. 6 is a schematic diagram of HARQ-ACK/NACK feedback according to the first embodiment.

Referring to FIG. 6, the base station configures the HARQ-ACK/NACK feedback mode per carrier. The base station configures that both carriers 1 and 2 employ the TB-based HARQ-ACK/NACK feedback. The two carriers both belong to the first group, and there is no second group. For each of the two carriers, two BWPs are configured by the base station. In the two BWPs of the carrier 1, BWP1 is configured to at most transmit one TB, and BWP2 is configured to at most transmit two TBs. The two BWPs of the carrier 2 are configured to at most transmit one TB. In accordance with the method of the present disclosure, the number of bits of the HARQ-ACK/NACK to be fed back by each PDSCH is 2, because one of the BWPs of the two carriers is configured to at most transmit two TBs. Therefore, for the BWP1 of the carrier 1 of the time unit the BWP2 of the carrier 2 of the time unit #1, the BWP2 of the carrier 1 of the time unit #2 and the BWP1 of the carrier 2 of the time unit #2, although each PDSCH actually scheduled by the base station merely must feed 1 bit of HARQ-ACK back, an additional reserved bit is transmitted to form 2 bits HARQ-ACK for each PDSCH. The total length of the HARQ-ACK/NACK codebook is 10 bits. Although the DAI of type II is not shown in the drawings, it is also applicable to the situation where the DAI of type II is include FIG. 7 is a schematic diagram of HARQ-ACK/NACK feedback according to a second embodiment.

Figure 7:
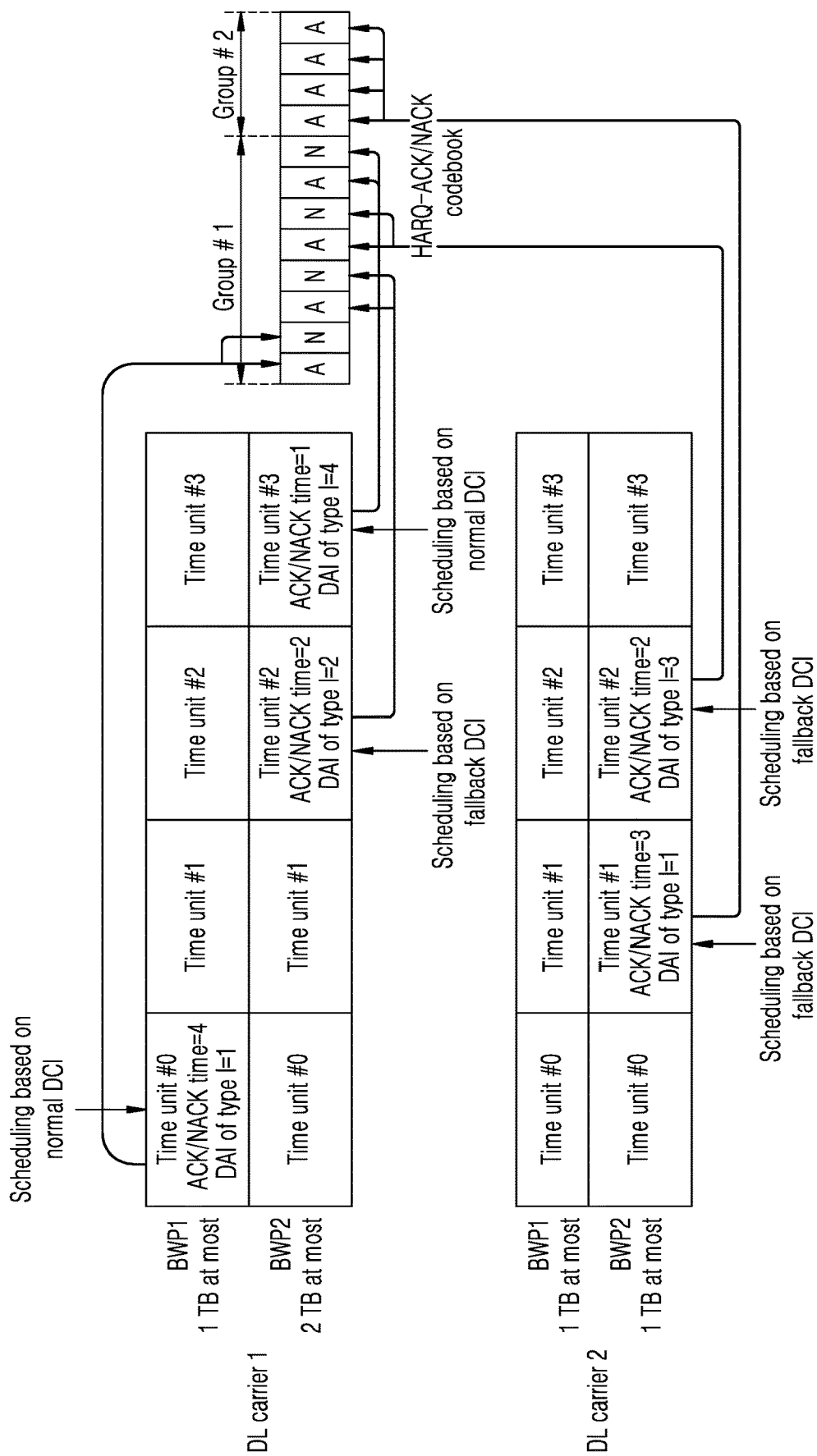
FIG. 7 is a schematic diagram of HARQ-ACK/NACK feedback according to an embodiment.

Referring to FIG. 7, the base station configures the HARQ-ACK/NACK feedback mode per BWP. The base station configures two BWPs of the carrier 1 with the TB-based HARQ-ACK/NACK feedback, wherein, in the two BWPs of the carrier 1, BWP1 is configured to at most transmit one TB, and BWP2 is configured to at most transmit two TBs. The base station configures two BWPs of the carrier 2, wherein BWP1 employs the TB-based HARQ-ACK/NACK feedback, BWP2 employs the CBG-based HARQ-ACK/NACK feedback, and the maximum number of CBGs is 4. The both BWPs are configured to at most transmit one TB. In accordance with the method of the present disclosure, there may be two groups. The first group associates with feedback granularity of a TB, and contains the BWP1 of the carrier 1 of the time unit #0, the BWP2 of the carrier 1 of the time unit #2, the BWP2 of the carrier 2 of the time unit #2 and the BWP2 of the carrier 1 of the time unit #3. Since the BWPs of the carrier 1 may at most transmit two TBs, the number of bits of the HARQ-ACK/NACK feedback for each PDSCH in the first group is N1=2. The second group associates with feedback granularity of a CBG and contains the BWP2 of the carrier 2 of the time unit #1; and the number N2 of bits of the feedback is the maximum number of CBGs of this MVP, that is, N2=4. The total length of the HARQ-ACK/NACK codebook is 12 bits. The DAI of type II is also applicable to the situation where the DAI of type II is included.

If the base station configures the HARQ-ACK feedback mode per BWP, as an implementation, the PDSCH is allocated to the first group if this BWP on which PDSCH is received is configured with the TB-based HARQ-ACK/NACK feedback, while the PDSCH is allocated to the second group if this BWP on which PDSCH is received is configured with the CBG-based HARQ-ACK/NACK feedback. If a BWP is configured with the CBG-based HARQ-ACK/NACK feedback, even if the base station schedules a PDSCH of this BWP by using fallback DCI, or by explicitly indicated scheduling using the TB granularity, or based on a mini slot, the number of bits of the HARQ-ACK/NACK of this PDSCH is still N2 instead of N1.

If the base station configures the HARQ-ACK feedback mode per BWP, as an implementation, the PDSCH on this carrier is allocated to the first group if all BWPs of a carrier are configured with the TB-based HARQ-ACK/NACK feedback, while the PDSCH on this carrier is allocated to the second group if at least one BWP of a carrier is configured with the CBG-based HARQ-ACK/NACK feedback. The number of bits of HARQ-ACKs for PDSCHs on other BWPs is still N2 instead of N1.

In the foregoing embodiments, if the base station further indicates a DAI of type III, the DAI of type III is used for indicating the total number of bits of the HARQ-ACK/NACKs for all groups. As an implementation, all bits of HARQ-ACK/NACKs for all groups are counted by the DAI of type III. As an implementation, if the DAI of type III indicates the maximum number of PDSCHs in each group, HARQ-ACKs for each group form an HARQ-ACK/NACK codebook, and the total size of the HARQ-ACK/NACK codebook is equal to $X_0*(N1+N2)$. If a mode supporting transmission of multiple TBs is configured, the total size of the HARQ-ACK/NACK codebook is equal to $X_0*(N1+N2)*2$ or $X_0*(N1+N2)$. As an implementation, if the DAI of type III indicates the total number $X_0$ and $X_1$ of PDSCHs in groups, the total size of the HARQ-ACK/NACK codebook is equal to $X_0*N1+X_1*N2$.

When HARQ-ACK/NACKs for PDSCHs in multiple PDSCH groups are fed back in a same PUCCH or PUSCH, in order to avoid the wrong determination of the size of the whole HARQ-ACK/NACK codebook or the bit disorder since the user terminal fails to detect parts of PDCCHs/PDSCHs in one PDSCH group, the base station may control the number of scheduled PDSCHs in a set PDSCH group to satisfy a predefined rule.

A rule is as follows: the number of scheduled PDSCHs in a PDSCH group is D*k, where D is an upper limit of the number of PDCCHs/PDSCHs continuously undetected by the user terminal, that is, the number of continuously undetected PDCCHs/PDSCHs is less than D. Generally, the upper limit of the number of continuously undetected PDCCHs/PDSCHs does not indicate that this value will not 100% be exceeded. Instead, it indicates that this value will not be exceeded at a very high probability. Therefore, this situation may not be taken into consideration in the system design. In the LTE system, D is set as 4. In the present disclosure, D may also be set as 4. When there are stricter requirements, D may be greater than 4; or, when there are less strict requirements, D may be less than 4. The k is a positive integer.

For example, the set PDSCH group may be all PDSCH groups required to feed back HARQ-ACKs in a same PUCC/PUSCH, or the all PDSCH groups required to feed back HARQ-ACKs in a same PUCC/PUSCH excluding the last PDSCH group. By taking two PDSCH groups as example, the set PDSCH group is the most front PDSCH group in the HARQ-ACK codebook. For example, it is assumed that a PDSCH group associates with the HARQ-ACK/NACK feedback granularity of a TB is placed in an earlier location as the first group, followed by a PDSCH group associates with the HARQ-ACK/NACK feedback granularity of a CBG as the second group. Thus, it is only necessary to define the number of scheduled PDSCHs in the first group to be an integral multiple of 4. It is advantageous that, no matter whether the user terminal fails to detect one, two or three PDSCHs continuously, the user terminal can determine the total number of bits of the HARQ-ACK codebook for the first group according to the DAI of type II of the first group.

In an implementation, the fallback DCI for scheduling PDSCHs may not contain the DAI of type II. The absence of the DAI of type II may result in the uncertain determination of the size of the HARQ-ACK codebook. In order to avoid this problem, for carriers configured with the CBG-based HARQ-ACK/NACK feedback, it may be limited that, the PDSCH may be allocated to the first class only when the base station uses normal DCI to explicitly indicate that the granularity of HARQ-ACK/NACK feedback is a TB, and the PDSCH is allocated to the second group in other cases. For example, the PDSCH scheduled by the fallback DCI is allocated to the second group and feeds back the HARQ-ACK by N2 bits. It is advantageous that, since the normal DCI contains the DAI of type II, the UE may determine the total size of the HARQ-ACK codebook for the first group according to the DAI of type II, so that the influence on the HARQ-ACK codebook for the later second group is avoided.

When the HARQ-ACK is fed back on a PUSCH, as described above, the DCI for scheduling the PUSCH may contain the DAL of type III. In a specific implementation, the normal DCI for scheduling the PUSCH may contain two DAIs of type III, which correspond to the size of two HARQ-ACK codebooks, respectively. The fallback DCI for scheduling the PUSCH may contain only one DAI of type III. In this case, if the UE must feed back HARQ-ACK codebooks for two PDSCH groups, the DAI of type III indicates a front PDSCH group in the HARQ-ACK codebooks. For example, a PDSCH group associated the HARQ-ACK/NACK feedback granularity of a TB is placed in an earlier location as the first group, followed by a PDSCH group associated with the HARQ-ACK/NACK feedback granularity of a CBG as the second group, Thus, the DAI of type III indicates the total number of bits of HARQ-ACKs for PDSCHs in the first group. It is advantageous that, after the total number of bits of the HARQ-ACK for the front PDSCH group has been determined, it is less likely to result in the disordered location of the starting point of bits of the HARQ-ACK for the second PDSCH group since one or more PDSCHs in this PDSCH group are not detected, so that the base station may blindly detect the length of the HARQ-ACK for the second PDSCH group and thus correctly decode the HARQ-ACKs for the two PDSCH groups. Accordingly, it is less likely to result in the problem that the base station cannot determine which part of the received HARQ-ACK codebook belongs to the first PDSCH group and which part of the HARQ-ACK codebook belongs to the second PDSCH group.

If the base station configures all carriers of a UE as carriers employing the CBG-based HARQ-ACK/NACK feedback, and if PDSCHs scheduled by using fallback DCI are classified into one group (i.e., a group associated with the feedback granularity of a TB) and PDSCHs scheduled by using normal DCI are classified into the other group (i.e., a group associated with the feedback granularity of a CBG), the HARQ-ACK for the PDSCH group associated with the feedback granularity of a CBG is placed in an earlier occasion in the whole HARQ-ACK codebook, and the HARQ-ACK for the PDSCH group associated with the feedback granularity of a TB is placed in a later occasion in the whole HARQ-ACK codebook. Advantageously, since the normal DCI contains the DAI of type II, the total number of bits of the HARQ-ACK for the PDSCH group associated with the feedback granularity of a CBG can be accurately decided, and a starting point of the HARQ-ACK for the later PDSCH group associated with the feedback granularity of a CBG can thus be accurately decided. After the total number of bits of the HARQ-ACK for the front PDSCH group has been determined, it is less likely to result in the disordered location of the starting point of bits of the HARQ-ACK for the second PDSCH group since one or more PDSCHs in this PDSCH group are not detected, so that the base station may blindly detect the length of the HARQ-ACK for the second PDSCH group and thus correctly decode the HARQ-ACKs for the two PDSCH groups. Accordingly, the problem that the base station cannot determine which part of the received HARQ-ACK codebook belongs to the first PDSCH group and which part of the HARQ-ACK codebook belongs to the second PDSCH group will not be caused.

The following description is provided according to a second embodiment.

In step 101 of FIG. 1, a UE receives, from a base station and in a downlink time unit, a PDSCH and control signaling.

In this case, the control signaling is DCI of a downlink assignment carried by a PDCCH or a control signaling carried by a PDSCH.

The downlink time unit of the received control signaling may be the same as or different from the downlink time unit of the PDSCH. A difference in time between the downlink time unit of the control signaling and the downlink time unit of the PDSCH may be configured by a higher layer, or may be configured by a higher layer and dynamically indicated by a bit field in DCI, or may be merely dynamically indicated by a bit field in DCI.

Generally, the downlink time unit for receiving the DCI of the control signaling is configured by a base station, and the UE may at least attempt to receive the DCI within the corresponding downlink time unit according to a configured control resource set (CORESET) and a search space. For convenience of description, the downlink time unit is described as a PDCCH monitoring occasion. The PDCCH monitoring occasion may appear in a slot for multiple times, or appear in several slots once. The PDCCH monitoring occasion may be configured by the base station, for example, configured separately for different carriers or different MVPs.

For a carrier or a BWP, the base station may configure one or more CORESETs for a UE, or may configure, for a UE, one or more search spaces corresponding to a same CORESET. These CORESETs and search spaces may be overlapped in time domain (for example, OFDM symbols) or overlapped in frequency domain (for example, RBs or sub-carriers). For example, the base station configures two CORESETs (i.e., CORESET1 and CORESET2) for the UE, where the CORESET1 occupies the first to tenth PRBs in the bandwidth and the CORESET2 occupies the sixth to twentieth PRBs in the bandwidth. Further, the CORESET1 and the CORESET2 are first two symbols in a slot in the time domain, respectively. The base station configures a search space1 for the CORESET1 and a search space2 for the CORESET2, and the search space1 and the search space2 are set to have a period of 10 ms and 20 ms respectively and both have a time offset of 0. Thus, in one PDCCH monitoring occasion (first two symbols of the corresponding slot) of slots 0, 20 and 40, the UE may need to detect two search spaces or two CORESETs.

Even if there is only one search space or only one CORESET in a same PDCCH monitoring occasion, the UE may detect multiple PDCCHs. For example, when the base station configures cross-carrier scheduling or cross-slot scheduling for the UE, the base station may transmit one or multiple PDCCHs in a same PDCCH monitoring occasion to schedule PDSCHs on different carriers, or PDSCHs in different slots or PDSCHs on different symbols of a same slot.

In step 102, the UE determines, based on the control signaling, an uplink time unit for feeding back an HARQ-ACK/NACK corresponding to the received PDSCH and an HARQ-ACK/NACK codebook corresponding to the uplink time unit.

The control signaling may contain a DAI of type I. The UE must determine a mapping value of the DAI of type I according to the received DAI of type I, then determine, according to the mapping value of the DAI of type I, a bit location of the HARQ-ACK/NACK corresponding to the received PDSCH in the HARQ-ACK/NACK codebook, and map bits of the HARQ-ACK/NACK onto corresponding bits of the HARQ-ACK/NACK codebook.

The definition of the DAI of type I has been described above in embodiment 1 and is not repeated here. For example, the mapping value of the DAI of type I indicates the number of scheduled PDSCHs from a first PDCCH monitoring occasion to the PDCCH monitoring occasion of a PDCCH corresponding to the DAI of type I, or the mapping value of the DAI of type I indicates the number of scheduled PDSCHs from the first PDCCH monitoring occasion to the PDCCH monitoring occasion of a PDCCH corresponding to the DAI of type I and to a carrier corresponding to the PDCCH. If the HARQ-ACK/NACK, codebook consists of HARQ-ACK/NACKs of two PDSCH groups, as described in the example of embodiment 1, the DAIs of type I are counted within each PDSCH group.

How the bit location of the HARQ-ACK is determined according to the mapping value of the DAI of type I is not be repeated here. For example, if the HARQ-ACK for each PDSCH has N bits, when the mapping value of the DAI of type I is X, it is indicated that the HARQ-ACK for the PDSCH corresponding to this DAI should be located at N successive bit locations from the $[(X-1)*N+1]^{th}$ bit location to the $(X*N)^{th}$ bit location in the HARQ-ACK codebook (in an HARQ-ACK codebook within the corresponding PDSCH if there is a PDSCH).

This embodiment focuses on how to sequence, according to a predetermined rule, DAIs of type I of PDSCHs required to feed back HARQ-ACK/NACKs on a same PUCCH or PUSCH and determine mapping values of the DAIs of type I. The predetermined rule may be determined according to one or more of the following.

(1) DAIs of type I are numbered according to the order of time resources of PDCCH monitoring occasion. If a starting point of a PDCCH monitoring occasion is earlier in the time domain, the numerical value of the DAI is less.

The PDCCH monitoring occasions may be determined according to parameters such as the period and time offset configured by the base station, and PDCCH monitoring occasions possibly to be numbered uniformly are determined according to the HARQ-ACK/NACK timing information indicated by the base station and/or information of a slot offset from the DCI to the scheduled PDSCH. For the PDCCH monitoring occasions possibly to be numbered uniformly, if the base station transmits PDCCHs in the PDCCH monitoring occasions and the HARQ-ACKs of scheduled PDSCHs are fed back on a same PUCCH or PDSCH, DAIs in the DCI of these PDCCHs need to be numbered uniformly. This method is also applicable to any one of the following (2) to (6).

For the DCI in which DAIs are to be numbered uniformly, numerical values of the DAIs are numbered in an increasing order according to the order of PDCCH monitoring occasions in the time domain from front (early) to back (late).

The numerical values of the DAIs may be less after the modulo operation, but the numerical values actually represented by the DAIs satisfy the rule described above. This will not be repeated in other parts of the present disclosure. For example, the value of a DAI in DCI in a PDCCH monitoring occasion of a first symbol of a first slot is 1(00), the value of a DAI in DCI in a PDCCH monitoring occasion of a second symbol of the first slot is 2(01), the value of a DAI in DCI in a PDCCH monitoring occasion of a third symbol of the first slot is 3(10), the value of a DAI in DCI in a PDCCH monitoring occasion of a first symbol of a second slot is 4(11), and the value of a DAI in DCI in a PDCCH monitoring occasion of a second symbol of the second slot is 5(00).

If the base station configures multiple carriers for the UE and configures a PDCCH monitoring occasion on at least one carrier, it is necessary to perform sequencing according to the sequential order of PDCCH monitoring occasions of all carriers in the time dimension. The base station may configure PDCCH monitoring occasions for different carriers or different BWPs, respectively, and the PDCCH monitoring occasions may be in the numerology of different sub-carrier spacings or cyclic prefixes. Therefore, it is possible that the PDCCH monitoring occasions of different carriers or BWPs are different temporally. For example, for different symbols or different slots, even if the starting point is the same, the ending location may be different. For example, different CORESETs may be different in time length, and for example, the length may be 1 to 3 symbols. As a simple method, DAIs may be sequenced in an increasing order according to the sequential order of the starting point of the PDCCH monitoring occasion of each carrier in the time dimension. It is to be noted that, the sequential order of starting points of PDCCH monitoring occasions is determined according to the sequential order of the absolute time, rather than the size of the value of symbols. For example, it is possible that the third symbol of a carrier having a large sub-carrier spacing is earlier in the absolute time than the second symbol of a carrier having a small sub-carrier spacing, and the value of the DAI in DCI of the third symbol of the carrier having a large sub-carrier spacing is less.

Figure 8:
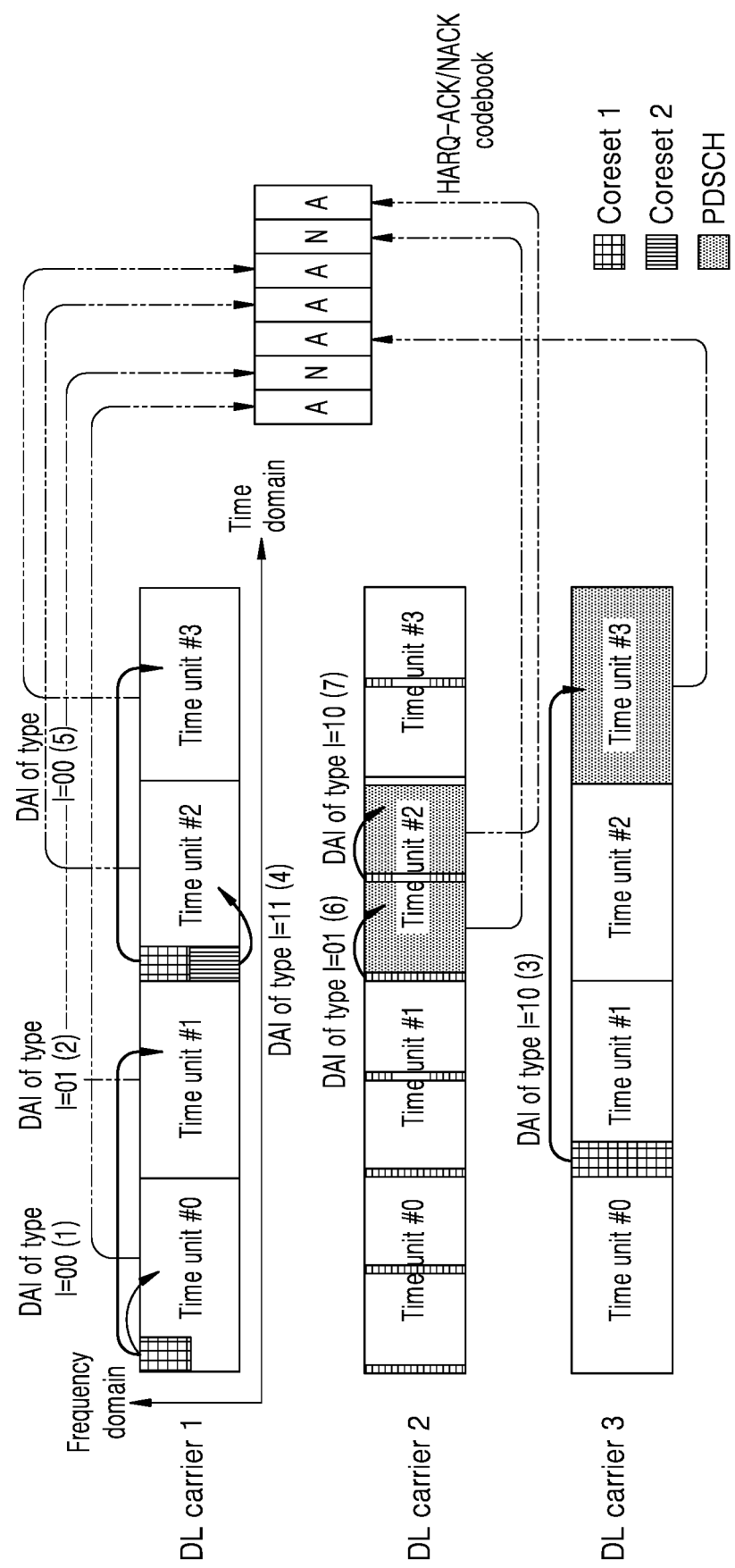
FIG. 8 is a schematic diagram of HARQ-ACK/NACK feedback according to an embodiment.

FIG. 8 is a schematic diagram of HARQ-ACK/NACK feedback according to the second embodiment of the present disclosure.

Referring to FIG. 8, the base station configures three carriers for the UE, and the PDCCH monitoring occasions on the carrier 1 are slots 0 and 2, respectively. In the slots 0 and 2, from the starting point of the slots, the PDCCH monitoring occasion occupies three symbols in the time dimension. On the carrier 2, the period of the PDCCH monitoring occasion is half of a slot. The starting point is a starting point of the first half of the slot which occupies one symbol, and a starting point of the second half of the slot which occupies one symbol. On the carrier 3, the PDCCH monitoring occasion occupies three symbols from the starting point of the slot 1. Thus, in accordance with the order of time resources of the starting points of the PDCCH monitoring occasions, the first PDCCH monitoring occasion where DCI is transmitted is a slot 0; the first PDCCH monitoring occasion where DCI is transmitted is a slot 0 and contains the carrier 1; the second PDCCH monitoring occasion where DCI is transmitted is a slot 1 and contains the carrier 3; the third PDCCH monitoring occasion where DCI is transmitted is the first half of the slot 2 and contains the carrier 1 and the carrier 2; and, the fourth PDCCH monitoring occasion where DCI is transmitted is the second half of the slot 2 and contains the carrier 2.

(2) In one PDCCH monitoring occasion, if there are PDCCHs scheduling PDSCHs on multiple carriers, for the multiple PDCCHs. DAIs of type I are sequenced in an increasing order of carrier indexes of the actually scheduled PDSCHs.

In combination with (1), the earliest PDCCH monitoring occasion in all carriers is determined according to the sequential order of the starting point of the PDCCH monitoring occasion of each carrier in the time dimension, and DAIs in DCI carried by each PDCCH in this occasion are successively sequenced according to the increasing order of carrier indexes of PDSCHs scheduled by the PDCCHs by the method described above in (2). Subsequently, the second PDCCH monitoring occasion earlier in time is found, DAIs in DCI carried by PDCCHs in this PDCCH monitoring occasion are continuously sequenced successively according to the increasing order of carrier indexes of the PDSCHs scheduled by the PDCCHs. The operation is performed in a similar way, until the operation to PDCCHs in the last PDCCH monitoring occasion is completed.

The present disclosure is not limited to the cross-carrier scheduling or the current-carrier scheduling. The indexes of carriers are indexes of carriers of the scheduled PDSCHs.

FIG. 8 shows an example where, in the third PDCCH monitoring occasion where DCI is transmitted, i.e., in the first half of the slot 2, a carrier 1 and a carrier 2 are contained. Thus, within this PDCCH monitoring occasion, the value of the DAI of the carrier 1 is lesser than the value of the DAI of the carrier 2.

When the UE has the ability to detect PDCCHs simultaneously on multiple BWPs, the sequencing method is as follows: PDCCH monitoring occasion in the time dimension is determined first, BWPs in each carrier are then sequenced according to the increasing order of carrier indexes of the scheduled carriers in this occasion, and DAIs of type I are numbered according to the increasing order of carrier indexes of the scheduled BWPs. In other words, BWPs in each carrier are sequenced first, and carriers are then sequenced.

(3) In one PDCCH monitoring occasion, if there exists multiple PDCCHs scheduling multiple PDSCHs of a same carrier or a same BWP, DAIs in DCI carried by the PDCCHs may be determined according to the order of time resources of the scheduled PDSCHs. For example, the sequential order of slots or symbols of the PDSCHs may be determined according to the time offset $K_0$ from PDCCHs to PDSCHs indicated in the DCI and the symbol starting point S of PDSCHs indicated in the DCI. If the value of $K_0$ is less, the slot of the PDCCH is earlier.

Alternatively, DAIs are numbered in an increasing order according to the starting point of frequency-domain resources actually occupied by each PDCCH, for example, according to the order from the smallest to largest minimum indexes of RBs.

The way for sequencing DAIs is not related to the presence of one or more CORESETs or search spaces in a PDCCH monitoring occasion.

In the one PDCCH monitoring occasion, if there are also PDCCHs without corresponding PDSCHs but the PDCCHs need to feed back HARQ-ACKs, for example, PDCCHs for releasing semi-persistent scheduling (SPS) PDSCHs, for DAIs of the PDCCHs, it may be considered that the value of a DAI is lesser than other scheduled PDSCHs as if it is earlier than other scheduled PDSCHs. For example, if the base station transmits, in a same PDCCH monitoring occasion, four PDCCHs to schedule a same carrier, one PDCCH releases the SPS of this carrier, while the other three PDCCHs schedule PDSCHs of this carrier, which are located in a same slot as the PDCCHs, a next slot of the PDCCHs and next two slots of the PDCCHs, respectively. Thus, the DAIs of the four PDCCHs are 1, 2, 3 and 4, respectively. Or, the PDCCH releasing the SPS PDCCH may be considered being later in time than other scheduled PDSCHs, that is, the value of the DAI is always the last one of the values of the DAIs of all PDSCHs corresponding to a same carrier in a same PDCCH monitoring occasion.

If multiple PDCCHs in the one PDCCH monitoring occasion schedule multiple PDSCHs of a same carrier and multiple PDCCHs schedule multiple PDSCHs of multiple carriers, in combination with (2) and (3), DAIs of type I in DCI carried by multiple PDCCHs having a lesser carrier index of PDSCHs are numbered in an increasing order according to the order of time resources of the PDSCHs and in accordance to (3), or DAIs are numbered in an increasing order of index of starting points of frequency-domain resources actually occupied by the PDCCHs; and, a same operation is performed on PDCCHs having a greater carrier index until the operation to PDCCHs of the last carrier is completed. In accordance to (2), the outermost cycle is the sequential order of PDCCH monitoring occasions on all carriers in the time dimension.

(4) If one carrier or BWP in one PDCCH monitoring occasion has multiple CORESETs or search spaces, DAIs of DCI in the PDCCH monitoring occasion may be sequenced according to parameters for the CORESETs or search spaces.

For example, DAIs may be numbered according to the order from the smallest to largest configuration indexes of the CORESETs or search spaces, or according to the order from smallest to largest numerical values jointly determined by configuration indexes of the CORESETs and search spaces, or according to the order from the smallest to largest indexes of starting points of frequency-domain resources occupied by the CORESETs or search spaces. For example, if two CORESETs occupy the second to tenth RBs and the twentieth to fortieth RBs in a BWP respectively, the DAI value in the DCI in the CORESET starting from second RB should be lesser than the DAI value in the DCI in the CORESET starting from twentieth RB.

If there are multiple PDCCHs in a same search space, DAIs in DCI carried by PDCCHs in the search space may be numbered in an increasing order according to the order from the smallest to largest minimum control element indexes (CCE indexes) actually occupied by the PDCCHs in this search space, or according to the sequential order of slots or symbols of the scheduled PDSCHs or according to the order from the smallest to largest indexes of frequency-domain resources actually occupied by PDCCHs carrying DCI. If there are multiple search spaces of a same carrier in one PDCCH monitoring occasion and multiple PDCCHs in one search space schedule multiple PDSCHs of a same carrier, DAIs of type I in DCI carried by the PDCCHs are numbered in an increasing order according to the order from the smallest to largest minimum CCE indexes occupied by the PDCCHs in a search space having a lesser unique identifier among the search spaces, and a same operation is performed on PDCCHs in a search space having a greater unique identifier until the operation to PDCCHs in the last search space is completed.

When there are multiple carriers in one PDCCH monitoring occasion and the multiple carriers contain multiple search spaces, DAIs of type I for each carrier are numbered in an increasing order from the smallest to largest carrier indexes according to the multiple search spaces of the carriers and the multiple PDCCHs in the search spaces until the operation to PDCCHs of the last carrier is completed.

If time-frequency resources of multiple CORESETs or search spaces are partially or completely overlapped and the UE cannot distinguish which CORESET or which search space the DCI received within an overlapped region belongs to, for example, same configured IDs, during the assigning the DAI values, the base station determines the DAI values according to a predefined assumption, for example, an assumption that the DCI belongs to a CORESET or search space having a lesser index among the overlapped CORESETs or search spaces.

(5) If multiple PDCCHs in one PDCCH monitoring occasion schedule multiple PDSCHs of a same carrier/BWP or multiple carriers/BWPs, the rule for sequencing DAIs in DCI carried by the PDCCH will not be limited. However, if there are identical values of DAIs in multiple pieces of DCI in one PDCCH monitoring occasion, DAIs need to be sequenced according to a predefined rule. In this case, the identical values of DAIs indicate that the actual values of DAIs after the modulo operation are identical. For example, since the DAI in DCI is 2 bits, values obtained after modulating 4 by DAI:=1 and DAI=5 are identical.

The predefined rule may be as follows: DAIs are sequenced according to the order from the smallest to largest indexes of carriers of the scheduled PDSCHs, and the number of PDCCHs corresponding to a same carrier does not exceed 4, for example, the number of transmitted PDCCHs scheduling PDSCHs of a same carrier and PDCCHs releasing SPS PDSCHs of this carrier does not exceed 4; or, DAIs are sequenced according to the order of time resources of the scheduled PDSCHs, and the number of PDSCHs which are scheduled to a same time location and located on different carriers does not exceed 4; or, DAIs are sequenced according to the carrier index first and then the order of time resources.

(6) if it is limited that the number of PDCCHs corresponding to a same carrier transmitted by the base station in a same PDCCH monitoring occasion does not exceed 4, for example, the number of transmitted PDCCHs scheduling PDSCHs of a same carrier and PDCCHs releasing SPS PDSCHs of this carrier does not exceed 4, it is not necessary to limit how to number DAIs of multiple PDCCHs scheduling a same carrier. The UE only must place, according to the value of a DAI, an HARQ-ACK for a PDSCH corresponding to the DAI in a corresponding location in the HARQ-ACK codebook. Thus, there is no problem that the UE cannot decide which DAI has a greater actual value (before being modulated), when it is detected in a same PDCCH monitoring occasion that DAIs of multiple pieces of DCIs of multiple PDSCHs scheduling a same carrier have identical values.

For example, the base station may sequence DAIs of type I in combination with (1), (2) and (3), or in combination with (1), (2) and (4), or in combination with (1), (2) and (6). The specific combinations may be related to the design of the system and will not be listed one by one. By taking the combination of (1), (2) and (3) as example, an implementation is described below, but other implementations are not excluded to achieve the effect of the combination of (1), (2) and (3). For example, there may be three loops at most, wherein the outermost loop is a set of PDCCH monitoring occasions in the time dimension (in an order from the earliest to latest starting points of PDCCH monitoring occasions of all carriers); the second loop is a set of PDCCHs in one PDCCH monitoring occasion across carriers (if the operation is performed in only one carrier, this loop may be cancelled; and the sequencing in the carrier dimension is performed according to an increasing order of carrier indexes of the scheduled PDSCHs); and, the third loop is a set of PDCCHs corresponding to one carrier in one PDCCH monitoring occasion (for example, sequencing is performed according to the increasing order of time resources of the scheduled PDSCHs). By taking the combination of (1), (2) and (6) as example, there are similarly three loops at most, wherein the outermost loop is a set of PDCCH monitoring occasions in the time dimension; the second loop is a set of PDCCHs in one PDCCH monitoring occasion in the carrier dimension; and, the third loop is a set of PDCCHs corresponding to one carrier in one PDCCH monitoring occasion. The difference lies in that the number of elements in the set in the last loop does not exceed 4 and the rule for sequencing DAIs will not be limited. By taking the combination of (1), (2) and (4) as example, it cart, be considered that there are four loops at most, wherein the outermost loop is a set of PDCCH monitoring occasions in the time dimension (in an order from the earliest to latest starting points of PDCCH monitoring occasions); the second loop is a set of PDCCHs in one PDCCH monitoring occasion in the carrier dimension (if the operation is performed in only one carrier, this loop may be cancelled; and the sequencing in the carrier dimension is performed according to the order from the smallest to largest indexes of carriers of the scheduled PDSCHs); the third loop is a set of CORESETs or search spaces in one carrier in one PDCCH monitoring occasion (if there is only one search space in one symbol, this loop may be cancelled); and, the fourth loop is a set of PDCCHs in one CORESET or search space (for example, in an increasing order of the lowest CCE indexes actually occupied by the received PDCCHs in this search space).

To ensure the correct reception of HARQ-ACKs, the UE and the base station must have the consistent interpretation on the method for sequencing DAIs of type I. Although the UE may fail to detect parts of PDSCHs, the UE may determine, according to the DAIs in the received DCI, the number of bits of HARQ-ACK/NACKs of undetected PDSCHs and the bit locations of HARQ-ACK/NACKs of undetected PDSCHs in the HARQ-ACK/NACK codebook.

Hereinafter, by taking FIG. 8 as an example, DAIs are sequenced according to the combination of (2) and (3). The base station configures three carriers for the UE and configures CORESET1 and CORESET2 on a carrier 1, which have a period of 2 slots and 4 slots, respectively. It is shown that, the CORESET1 appears in slots 0 and 2, while the CORESET2 appears in the slot 2. In these appeared slots, the CORESETs occupy three symbols from the starting point of the slots, and the frequency-resources occupied by the CORESETs are the first to tenth PRBs and the eleventh to twentieth PRBs, respectively. CORESET1 is configured on a carrier 2 and has a period of half of a slot. The starting point is a starting point of the first half of the slot which occupies one symbol, and a starting time of the second half of the slot which occupies one symbol. The frequency-domain resources are 20 PRBs. CORESET1 is configured on the carrier 3 and has a period of 4 slots. It is shown that the CORESET1 appears in the slot 1 and occupies 3 symbols from the starting point of the slot 1, and the frequency-domain resources are 20 PRBs. Thus, in accordance to the order of time resources of PDCCH monitoring occasions, the first PDCCH monitoring occasion where DCI is transmitted is the slot 0; the base station transmits two pieces of DCI on the CORESET1 of the carrier 1 to respectively schedule PDSCHs of the slots 0 and 1; and according to the sequential order of the scheduled PDSCHs, the values of DAIs are 1 and 2, respectively. Subsequently, the next PDCCH monitoring occasion where DCI is transmitted by the base station is the slot 1, DCI for scheduling PDSCHs in the slot 3 is transmitted on the carrier 3, and the value of the DAI should be 3. The next PDCCH monitoring occasion where DCI is transmitted by the base station is the slot 2. There are two PDCCH monitoring occasions in the slot 2. First, in the PDCCH monitoring occasion at the starting point of the slot 2, the base station transmits DCI on both the carrier 1 and the carrier 2, and there are two CORESETs on the carrier 1, so that the DAIs of a carrier having a lesser carrier number (i.e., the carrier 1) is sequenced first, and the DAI of the CORESET2 of the carrier 1 is sequenced in front.

Since the time location of the PDSCH scheduled by the CORESET2 is earlier than the time location of the PDSCH scheduled by the CORESET 1, the value of the DAI is 4, which is successively followed by the value of the DAI of the CORESET1 (this value is 5) and the value of the DAI of the carrier 2 (this value is 6). Subsequently, in the next PDCCH monitoring occasion in the slot 2, i.e., at the starting point of the second half of the slot 2, the base station transmits DCI of the carrier 2, where the value of the DAI in the DCI is 7. The UE maps, according to the detected DCI and the value of the DAI, HARQ-ACK/NACKs of seven PDSCHs into the HARQ-ACK/NACK codebook, respectively. If it is assumed that each PDSCH is a simple TB without configuring any CBG, the total number of bits is 7.

For the reception of SPS PDSCHs, there is no corresponding DCI. Generally, when the UE is configured with a dynamic HARQ-ACK/NACK codebook, bits of HARQ-ACK of SPS PDSCHs may be placed after HARQ-ACKs of PDSCHs which are scheduled based on DCI or PDCCHs releasing SPS PDSCHs. No matter whether the UE has received the DCI of PDSCHs scheduling the same HARQ process as the SPS PDSCHs, the UE must feed bits of HARQ-ACKs of the SPS PDSCHs back according to the HARQ feedback time of the SPS PDSCHs and place the bits of HARQ-ACKs at the later part of the HARQ-ACK codebook. For example, a SPS PDSCH1 should receive in a slot n, and an HARQ-ACK/NACK should be fed back in a slot n+4. If the base station transmits DCI in a slot n−1 to schedule retransmission of the SPS PDSCH1 and indicates to feed an HARQ of this SPS PDSCH1 back in a slot n+5, and if the base station transmits DCI in a slot n+1 to schedule another PDSCH2 and feeds an HARQ back in a slot the UE must feed HARQ-ACKs of both the PDSCH1 and the PDSCH 1 back in the slot n1-4 and to feed an HARQ-ACK of the PDSCH1 back in the slot n+5. In this way, the issue of the generation of a wrong HARQ-ACK/NACK codebook since the UE fails to detect DCI of rescheduled SPS PDSCHs may be avoided.

The control signaling may further contain a. DAI of type II and/or a DAI of type III. The UE generates an HARQ-ACK/NACK codebook according to the DAI of type I and/or the DAI of type II and/or the DAI of type III. The method may refer to embodiment 1 and is not repeated here.

In step 103 of FIG. 1, the UE transmits, on a PUCCH or PUSCH of the uplink time unit, HARQ-ACK/NACK information corresponding to the HARQ-ACK/NACK codebook.

The following description is provided according to a third embodiment of the present disclosure.

In the third embodiment of the present disclosure, in step 103, when the UE transmits HARQ-ACK information on a PDSCH of the uplink time unit, it is necessary to determine the number of physical resources in the PUSCH occupied by the HARQ-ACK information.

During the scheduling of the control signaling (UL grant) of the PUSCH, the base station not only indicates the DAI of type III but also indicates a parameter $\beta_{offset}$ for controlling the number of physical resources occupied by the HARQ-ACK. An example of the $\beta_{offset}$ is $\beta_{offset}^{PUSCH} = \beta_{offset}^{HARQ-ACK}$ in Equation (1) below. Equation Q' below, Q' is the modulation symbols of the HARQ-ACK, O is the number of bits of the HARQ-ACK, $M_{SC}^{PUSCH}$ is the bandwidth of the PUSCH, $N_{symb}^{PUSCH-initial}$ is the number of symbols available for the transmission of the PUSCH, C is the number of code blocks, and $K_r$ is the number of bits of each code block. However, the present disclosure is not limited to Equation (1) below.

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right) \quad (1)$$

The DAI of type III and the $\beta_{offset}$ may be indicated by jointly encoding. In some examples, to achieve the same HARQ-ACK/NACK BER performance, the corresponding $\beta_{offset}$ when the HARQ-ACK/NACK information is multiplexed in the PUSCH by puncturing the PUSCH is often greater than the corresponding $\beta_{offset}$ when the HARQ-ACK/NACK information is multiplexing in the PUSCH by rate matching. When multiplexing in PUSCH by rate matching, the corresponding to more bits of the HARQ-ACK/NACK information is often greater than the $\beta_{offset}$ corresponding to less bits of the HARQ-ACK/NACK information. During the jointly encoding, multiple combinations of the DAI of type III with the $\beta_{offset}$ may be configured by a higher layer, and one of the combinations may be indicated by scheduling of the control signaling of the PUSCH. For example, when a higher layer configures a combination, a DAI of type III having a greater value may be combined with a lesser $\beta_{offset}$, and a DAI of type III having a lesser value may be combined with a greater $\beta_{offset}$.

As an implementation, the base station configures a set of $\beta_{offset}$. According to the indicated value of the DAI of type III, both the base station and the user terminal may uniquely determine one value from the set of $\beta_{offset}$. For example, when the length of bit field of DAI of type III is 2 bits, four states correspond to HARQ-ACK/NACK of X1 bits, X2 bits, X3 bits and X4 bits, respectively. The set of $\beta_{offset}$ includes $\beta_{offset1}$, $\beta_{offset2}$, $\beta_{offset3}$ and $\beta_{offset4}$. Thus, Xi corresponds to $\beta_{offset}$. Alternatively, the configured set of $\beta_{offset}$ corresponds to a set of thresholds for the DAI of type III. The value of the corresponding $\beta_{offset}$ is determined according to the indicated value of the DAI of type III and the threshold for the DAI of type III.

In the foregoing embodiments, the uplink time unit for carrying bits of the HARQ-ACK/NACK may be a slot or a mini slot. Further, the downlink time unit of the PDSCH may be a slot or a mini slot. Typically, the length of the slot is 14 OFDM symbols. The length of the mini slot is 2, 4 or 7 OFDM symbols. For example, the downlink time unit for receiving downlink data is a slot, and the uplink time unit for feeding back the ACK/NACK is also a slot; or, the downlink time unit for receiving downlink data is a mini slot, and the uplink time unit for feeding back the ACK/NACK is also a mini slot; or, the downlink time unit for receiving downlink data is a slot, and the uplink time unit for feeding back the ACK/NACK, is a mini slot; or, the downlink time unit for receiving downlink data is a mini slot, and the uplink time unit for feeding back the ACK/NACK is a slot. Whether the uplink/downlink time unit is a slot or a mini slot may be configured by a higher layer or determined by a predefined rule, or may be indicated by dynamic signaling.

Figure 11:
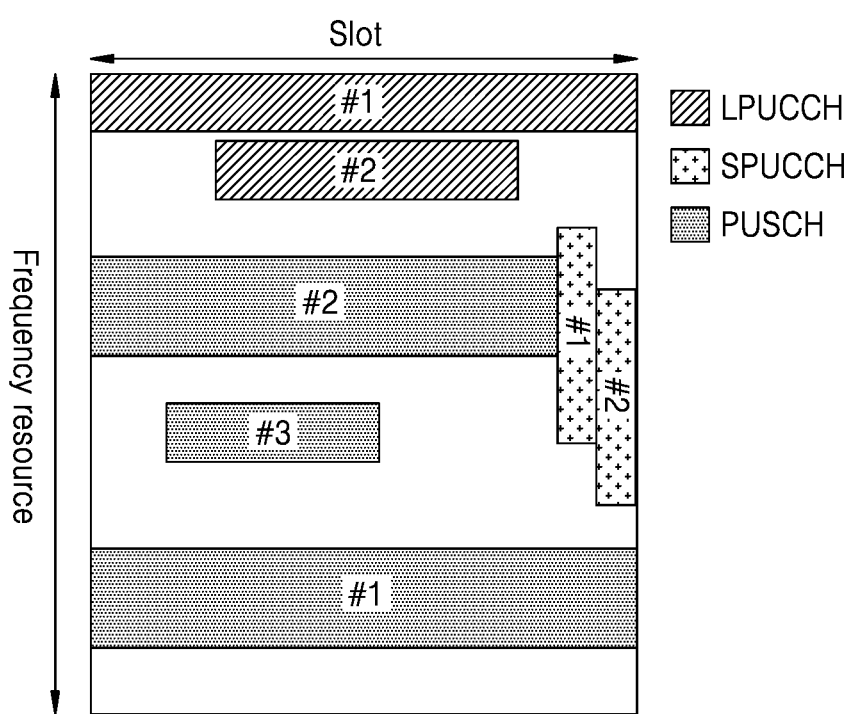
FIG. 11 is a schematic diagram of an uplink channel capable of carrying HARQ-ACK/NACK information according to an embodiment.

An uplink physical channel for carrying the HARQ-ACK information may be a PUCCH or a PUSCH. The PUCCH may be a long PUCCH having a minimum length of four symbols and a maximum length of 14 symbols; or, the PUCCH may span multiple slots; or, the PUCCH may also be a short PUCCH having a length of one or two OFDM symbols, as shown in FIG. 11.

Figure 9:
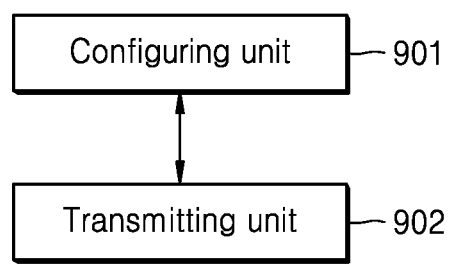
FIG. 9 is a block diagram of a downlink transmission equipment according to an embodiment.

FIG. 9 is a block diagram of a downlink transmission equipment 900 according to an embodiment. In this case, a base station may perform downlink transmission by the downlink transmission equipment 900 of the present disclosure.

Referring to FIG. 9, the downlink transmission equipment 900 may include a configuring unit 901 and a transmitting unit 902. For example, the configuring unit 901 configures a control signaling.

The transmitting unit 902 transmits, within a downlink time unit, a PDSCH and the control signaling to a UE. Here, the control signaling can be used for determining at least one of the following information used for feedback of the UE: an uplink time unit of an HARQ-ACK/NACK corresponding to the PDSCH, the size of an HARQ-ACK/NACK codebook corresponding to the uplink time unit, the bit length of an HARQ-ACK/NACK corresponding to each downlink time corresponding to the uplink time unit, a PDSCH group of the downlink time unit corresponding to the uplink time unit, the occasion of the PDSCH in an HARQ-ACK/NACK codebook for this PDSCH group, and the number of physical resources occupied by the HARQ-ACK/NACK codebook.

Figure 10:
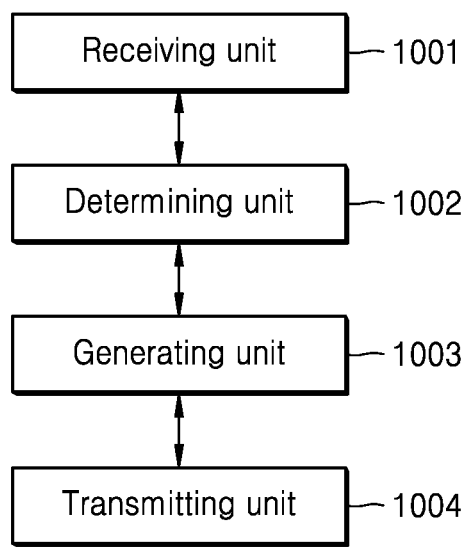
FIG. 10 is a block diagram of a downlink transmission equipment according to an embodiment.

FIG. 10 is a block diagram of a downlink transmission equipment 1000 for transmitting an HARQ-ACK/NACK according to an embodiment. In this case, a UE may transmit an HARQ-ACK/NACK by the equipment 1000 for transmitting an HARQ-ACK/NACK.

Referring to FIG. 10, the uplink transmission equipment 1000 may include a receiving unit 1001, a determining unit 1002, a generating unit 1003 and a transmitting unit 1004. The receiving unit 1001 receives, from a base station, a PDSCH and a control signaling within a downlink time unit.

The determining unit 1002 determines, based on the control signaling, an uplink time unit for feeding back an HARQ-ACK of the PDSCH, the granularity of HARQ-ACK feedback of the PDSCH or the bit length of the HARQ-ACK feedback.

The generating unit 1003 generates an HARQ-ACK/NACK codebook containing bits of the HARQ-ACK of the PDSCH. The transmitting unit 1004 transmits the HARQ-ACK/NACK codebook within the uplink time unit.

FIG. 11 is a schematic diagram of an uplink channel capable of carrying HARQ-ACK/NACK information according to an embodiment.

The foregoing descriptions are merely examples of implementations of the present disclosure. To a person of ordinary skill in the art, various improvements and modifications can be made without departing from the scope of the present disclosure as defined by the appended claims and their equivalents.

What is claimed is:

1. A method performed by a user equipment (UE) in a wireless communication system, the method comprising:
  receiving downlink control information (DCI) for scheduling physical downlink shared channel (PDSCH);
  receiving the PDSCHs based on the DCI;
  identifying values regarding a reception starting time of the PDSCHs, serving cell indices and physical downlink control channel (PDCCH) monitoring occasion (MO) indices, based on the DCI;
  obtaining a hybrid automatic repeat request acknowledgement/negative acknowledgement (HARQ-ACK/NACK) codebook by multiplexing HARQ-ACK information for the PDSCHs, according to an order of downlink assignment indices (DAIs) identified based on the values regarding the reception starting time of the PDSCHs, the serving cell indices and the PDCCH MO indices; and
  transmitting the HARQ-ACK/NACK codebook.

2. The method of claim 1, wherein the order of DAIs for PDSCHs with a same service cell and a same MO are identified based on an increasing order of the values regarding the reception starting time of the PDSCHs.

3. The method of claim 1, wherein the order of DAIs are firstly identified based on an increasing order of the values regarding the reception starting time, secondly identified based on an ascending order of serving cell indices, and thirdly identified based on an ascending order of the PDCCH MO indices.

4. The method of claim 1, wherein the values regarding the reception starting time includes a time offset indicated in the DCI.

5. A user equipment (UE), comprising:
  a transceiver; and
  a processor configured to:
    receive, via the transceiver, downlink control information (DCI) for scheduling physical downlink shared channel (PDSCH)s,
    receive, via the transceiver, the PDSCHs based on the DCI,
    identify values regarding reception starting time of the PDSCHs, serving cell indices and physical downlink control channel (PDCCH) monitoring occasion (MO) indices, based on the DCI,
    obtain a hybrid automatic repeat request acknowledgement/negative acknowledgement (HARQ-ACK/NACK) codebook by multiplexing HARQ-ACK information for the PDSCHs, according to an order of downlink assignment indices (DAIs) identified based on the values regarding the reception starting time of the PDSCHs, the serving cell indices and the PDCCH MO indices, and
    transmit, via the transceiver, HARQ-ACK/NACK codebook.

6. The UE of claim 5, wherein the order of DAIs for PDSCHs with a same service cell and a same MO are identified based on an increasing order of the values regarding the reception starting time of the PDSCHs.

7. The UE of claim 5, wherein the order of DAIs are firstly identified based on an increasing order of the values regarding the reception starting time, secondly identified based on an ascending order of serving cell indices, and thirdly identified based on an ascending order of the PDCCH MO indices.

8. The UE of claim 5, wherein the values regarding the reception starting time includes time offset indicated in the DCI.

9. A method performed by a base station (BS) in a wireless communication system, the method comprising:
  transmitting downlink control information (DCI) for scheduling physical downlink shared channel (PDSCH)s;
  transmitting the PDSCHs based on the DCI, to a user equipment (UE); and
  receiving, from the UE, a hybrid automatic repeat request acknowledgement/negative acknowledgement (HARQ-ACK/NACK) codebook including HARQ-ACK information for the PDSCHs, multiplexed according to an order of downlink assignment indices (DAIs) identified based on values regarding a reception starting time of the PDSCHs, serving cell indices and physical downlink control channel (PDCCH) monitoring occasion (MO) indices,
  wherein the values regarding the reception starting time of the PDSCHs, the serving cell indices and the PDCCH MO indices are identified based on the DCI, at the UE.

10. The method of claim 9, wherein the order of DAIs for PDSCHs with a same service cell and a same MO are identified based on an increasing order of the values regarding the reception starting time of the PDSCHs.

11. The method of claim 9, wherein the order of DAIs are firstly identified based on an increasing order of the values regarding the reception starting time, secondly identified based on an ascending order of serving cell indices, and thirdly identified based on an ascending order of the PDCCH MO indices.

12. The method of claim 9, wherein the values regarding the reception starting time includes a time offset indicated in the DCI.

13. A base station (BS) comprising:
a transceiver; and
a processor configured to:
transmit, via the transceiver, downlink control information (DCI) for scheduling physical downlink shared channel (PDSCH);
transmit, via the transceiver, the PDSCHs based on the DCI, to a user equipment (UE); and
receive, via the transceiver from the UE, a hybrid automatic repeat request acknowledgement/negative acknowledgement (HARQ-ACK/NACK) codebook including HARQ-ACK information for the PDSCHs, multiplexed according to an order of downlink assignment indices (DAIs) identified based on values regarding a reception starting time of the PDSCHs, serving cell indices and physical downlink control channel (PDCCH) monitoring occasion (MO) indices,
wherein the values regarding the reception starting time of the PDSCHs, the serving cell indices and the PDCCH MO indices are identified based on the DCI, at the UE.

14. The BS of claim 13, wherein the order of DAIs for PDSCHs with a same service cell and a same MO are identified based on an increasing order of the values regarding the reception starting time of the PDSCHs.

15. The BS of claim 13, wherein the order of DAIs are firstly identified based on an increasing order of the values regarding the reception starting time, secondly identified based on an ascending order of serving cell indices, and thirdly identified based on an ascending order of the PDCCH MO indices.

16. The BS of claim 13, wherein the values regarding the reception starting time includes a time offset indicated in the DCI.

* * * * *